(12) United States Patent
Watanabe et al.

(10) Patent No.: US 10,819,899 B2
(45) Date of Patent: Oct. 27, 2020

(54) IMAGE ACQUISITION DEVICE AND IMAGE ACQUISITION SYSTEM

(71) Applicant: OLYMPUS CORPORATION, Hachioji-shi, Tokyo (JP)

(72) Inventors: Satoshi Watanabe, Tokyo (JP); Kazuaki Murayama, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/679,890

(22) Filed: Nov. 11, 2019

(65) Prior Publication Data
US 2020/0077015 A1 Mar. 5, 2020

Related U.S. Application Data

(63) Continuation of application No. PCT/JP2017/018405, filed on May 16, 2017.

(51) Int. Cl.
*H04N 5/232* (2006.01)
*G02B 3/00* (2006.01)
(Continued)

(52) U.S. Cl.
CPC ....... *H04N 5/23212* (2013.01); *G02B 3/0037* (2013.01); *G03B 17/14* (2013.01); *H04N 5/23209* (2013.01); *G02B 27/0075* (2013.01)

(58) Field of Classification Search
None
See application file for complete search history.

(56) References Cited

U.S. PATENT DOCUMENTS 8,305,429 B2 11/2012 Kajihara et al.
8,675,114 B2 3/2014 Watanabe et al.
(Continued)

FOREIGN PATENT DOCUMENTS

EP 2104334 A1 9/2009
JP 2007199226 A 8/2007
(Continued)

OTHER PUBLICATIONS

Related U.S. Appl. No. 16/679,724; Title: Imaging Device; First Named Inventor: Satoshi Watanabe; Date filed: Nov. 11, 2019.
(Continued)

*Primary Examiner* — William B Perkey
(74) *Attorney, Agent, or Firm* — Holtz, Holtz & Volek PC

(57) ABSTRACT

An image acquisition device according to the present invention includes: an image-acquisition-optical-system; a microlens array having microlenses; a phase filter modulating a phase distribution to light incident on the microlenses via the image-acquisition-optical-system; a light receiving unit receiving the light focused by the microlenses by light receiving elements; an adjusting unit switching between a first arrangement state in which the light receiving elements are arranged at back focal positions of the microlenses and a second arrangement state in which the light receiving elements are arranged in vicinities of principal point positions of the microlenses; a memory storing a point image intensity distribution at the light receiving unit in each of the arrangement states; and an arithmetic operation unit generating a processed image by using the point image intensity distribution and image information at the light receiving unit in each of the arrangement states.

12 Claims, 16 Drawing Sheets

(51) Int. Cl.
*G02B 27/00* (2006.01)
*G03B 17/14* (2006.01)

(56) References Cited

U.S. PATENT DOCUMENTS

| | | | |
|---|---|---|---|
| 9,113,066 B2 | 8/2015 | Watanabe | |
| 9,201,289 B2 | 12/2015 | Tanaka et al. | |
| 10,021,289 B2 | 7/2018 | Inagaki | |
| 10,321,044 B2 | 6/2019 | Inagaki | |
| 2008/0165270 A1* | 7/2008 | Watanabe | H04N 5/23245 348/340 |
| 2008/0309813 A1* | 12/2008 | Watanabe | G02B 27/0075 348/340 |
| 2009/0190022 A1* | 7/2009 | Ichimura | G02B 3/0056 348/340 |
| 2010/0066812 A1* | 3/2010 | Kajihara | H04N 5/232 348/46 |
| 2013/0076931 A1* | 3/2013 | Border | G02B 27/0075 348/222.1 |
| 2013/0235261 A1 | 9/2013 | Berkner et al. | |
| 2014/0184885 A1 | 7/2014 | Tanaka et al. | |
| 2016/0191787 A1 | 6/2016 | Inagaki | |
| 2017/0195540 A1* | 7/2017 | Sambongi | H04N 5/23296 |
| 2017/0261731 A1* | 9/2017 | Shimada | G02B 21/025 |
| 2017/0285353 A1* | 10/2017 | Liu | G02B 5/201 |
| 2017/0302839 A1* | 10/2017 | Borel | H04N 5/2352 |
| 2018/0180836 A1* | 6/2018 | Huang | H04N 5/2352 |
| 2018/0270409 A1 | 9/2018 | Inagaki | |
| 2018/0278859 A1* | 9/2018 | Suga | H01L 27/14627 |
| 2019/0121110 A1* | 4/2019 | Miyazaki | G02B 21/00 |
| 2020/0077015 A1* | 3/2020 | Watanabe | H04N 5/23212 |

FOREIGN PATENT DOCUMENTS

| | | |
|---|---|---|
| JP | 2008167395 A | 7/2008 |
| JP | 2008172347 A | 7/2008 |
| JP | 2008312080 A | 12/2008 |
| JP | 2009017079 A | 1/2009 |
| JP | 2010102230 A | 5/2010 |
| JP | 2013122505 A | 6/2013 |
| JP | 2013187914 A | 9/2013 |
| JP | 2014086899 A | 5/2014 |
| JP | 2014130277 A | 7/2014 |
| JP | 2014206563 A | 10/2014 |
| JP | 2015041950 A | 3/2015 |
| JP | 2015046019 A | 3/2015 |
| JP | 2016126144 A | 7/2016 |
| WO | 2018211603 A1 | 11/2018 |

OTHER PUBLICATIONS

International Search Report (ISR) dated Aug. 15, 2017 (and English translation thereof) issued in International Application No. PCT/JP2017/018405.

International Search Report (ISR) dated Aug. 15, 2017 (and English translation thereof) issued in International Application No. PCT/JP2017/018410.

Written Opinion (WO) dated Aug. 15, 2017 issued in International Application No. PCT/JP2017/018405.

Written Opinion (WO) dated Aug. 15, 2017 issued in International Application No. PCT/JP2017/018410.

* cited by examiner

IMAGE ACQUISITION DEVICE AND IMAGE ACQUISITION SYSTEM

CROSS-REFERENCE TO RELATED APPLICATIONS

This is a continuation of International Application PCT/JP2017/018405, with an international filing date of May 16, 2017, which is hereby incorporated by reference herein in its entirety.

TECHNICAL FIELD

The present invention relates to an image acquisition device and an image acquisition system.

BACKGROUND ART

There is a well-known technology regarding light-field image acquisition devices: that include an image acquisition element in which a plurality of pixels are two-dimensionally arranged, and a microlens array having microlenses arranged on the subject side with respect to the image acquisition element so as to correspond to units of pixels of the image acquisition element; and that acquire an image of a three-dimensional distribution of the subject (refer to, for example, Japanese Unexamined Patent Application, Publication No. 2010-102230).

In order to flexibly meet demands for various representation directions in a camera and various methods for observing a subject with a microscope, it is desirable that the camera and microscope can provide, with a simple configuration, images such as light-field images that produce, from the same subject, different effects from those of normally acquired images (images that produce different effects from those of such normally acquired images are referred to as, for example, functional images). In general, devices for providing images that produce different effects from those of normally acquired images have a highly specialized configuration, as do conventional light-field image acquisition devices.

When inserted between the lens and the body of the lens-interchangeable camera, the camera lens adaptor described in Japanese Unexamined Patent Application, Publication No. 2010-102230 allows light-field images to be acquired.

SUMMARY OF INVENTION

A first aspect of the present invention is an image acquisition device including: an image-acquisition optical system that focuses light from a subject and that forms a primary image of the subject; a microlens array having a plurality of microlenses that are two-dimensionally arranged at a position of the primary image formed by the image-acquisition optical system or at a position conjugate to the primary image and that focus light from the image-acquisition optical system; a pupil modulation element that is disposed at the position of an exit pupil of the image-acquisition optical system, said exit pupil being located on the subject side with respect to the microlens array, or at a position conjugate to the exit pupil and that applies modulation of a phase distribution and/or a transmittance distribution to light to be made incident on the plurality of microlenses via the image-acquisition optical system; a light receiving unit that has a plurality of light receiving elements arranged in units of regions corresponding to the plurality of microlenses, that receives the light focused by the plurality of microlenses, and that performs photoelectric conversion of the light; an adjusting unit that switches between a first arrangement state in which the plurality of light receiving elements are arranged at back focal positions of the microlenses or at positions conjugate to the back focal positions and a second arrangement state in which the plurality of light receiving elements are arranged in the vicinities of principal point positions of the microlenses or at positions conjugate to the principal point positions; a memory unit that stores a first point image intensity distribution indicating a point image intensity distribution for each position on the subject at the light receiving unit in the first arrangement state and a second point image intensity distribution indicating a point image intensity distribution of the subject at the light receiving unit in the second arrangement state; and an arithmetic operation unit that generates a first processed image by using the first point image intensity distribution stored in the memory unit and first image information obtained by photoelectric conversion by the light receiving unit in the first arrangement state and that generates a second processed image by using the second point image intensity distribution stored in the memory unit and second image information obtained by photoelectric conversion by the light receiving unit in the second arrangement state.

A second aspect of the present invention is an image acquisition system including: an image acquisition device including an image-acquisition optical system that focuses light from a subject and that forms a primary image of the subject, a microlens array having a plurality of microlenses that are two-dimensionally arranged at the position of the primary image formed by the image-acquisition optical system or at a position conjugate to the primary image and that focus light from the image-acquisition optical system, a pupil modulation element that is disposed at the position of an exit pupil of the image-acquisition optical system, said exit pupil being located on the subject side with respect to the microlens array, or at a position conjugate to the exit pupil and that applies modulation of a phase distribution and/or a transmittance distribution to light to be made incident on the plurality of microlenses via the image-acquisition optical system, a light receiving unit that has a plurality of light receiving elements arranged in units of regions corresponding to the plurality of microlenses, that receives the light focused by the plurality of microlenses, and that performs photoelectric conversion of the light, and an image acquisition device having an adjusting unit that switches between a first arrangement state in which the plurality of light receiving elements are arranged at back focal positions of the microlenses or at positions conjugate to the back focal positions and a second arrangement state in which the plurality of light receiving elements are arranged in the vicinities of principal point positions of the microlenses or at positions conjugate to the principal point positions; a memory unit that stores a first point image intensity distribution indicating a point image intensity distribution for each position on the subject at the light receiving unit in the first arrangement state and a second point image intensity distribution indicating a point image intensity distribution of the subject at the light receiving unit in the second arrangement state; and an arithmetic operation unit that generates a first processed image by using the first point image intensity distribution stored in the memory unit and first image information obtained by photoelectric conversion by the light receiving unit in the first arrangement state and that generates a second processed image by using the second point image intensity distribution stored in the memory unit and second image information obtained by photoelectric conversion by the light receiving unit in the second arrangement state.

DESCRIPTION OF EMBODIMENTS

First Embodiment

An image acquisition device according to a first embodiment of the present invention will now be described with reference to the drawings.

Figure 1:
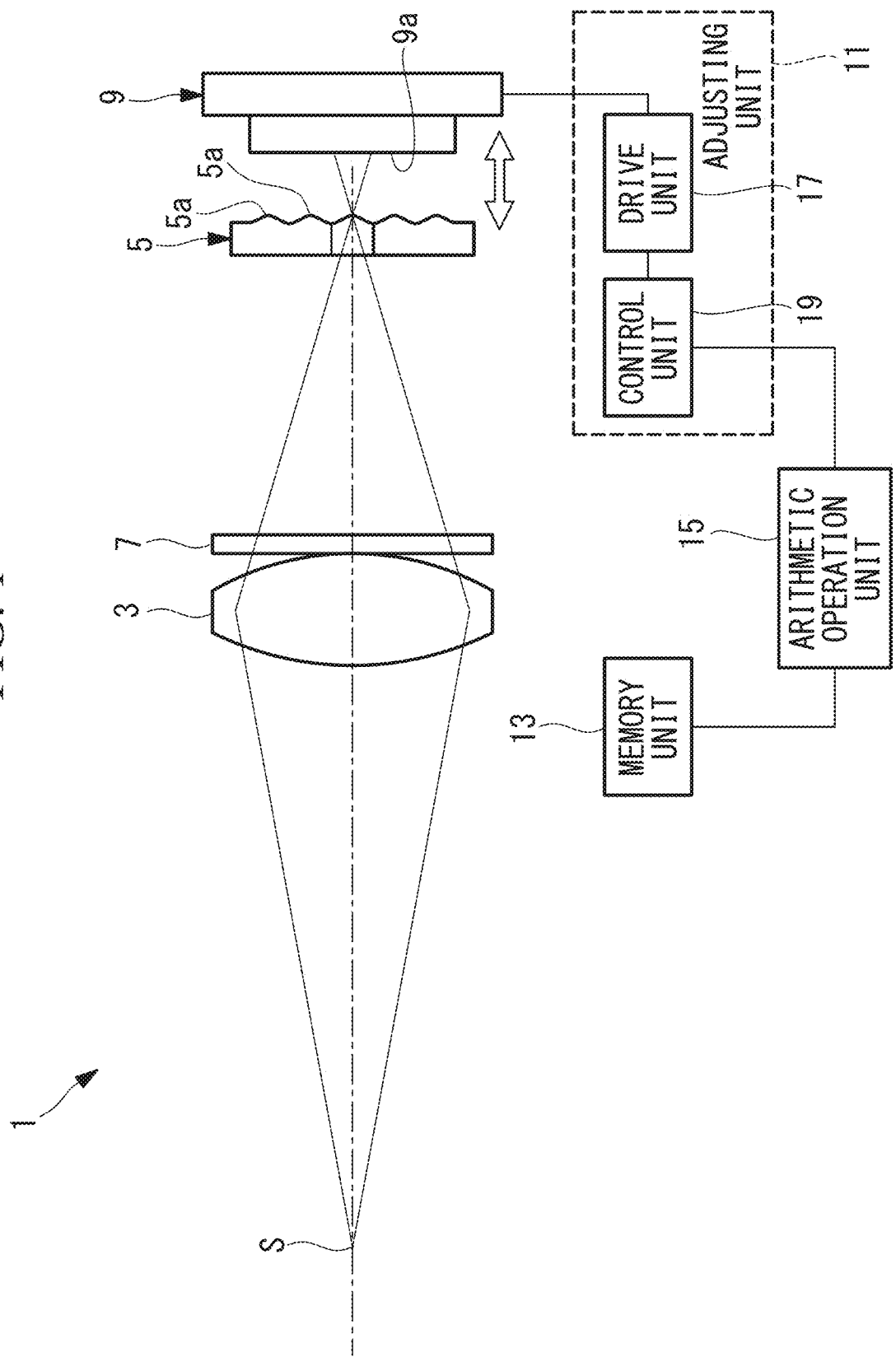
FIG. 1 is a schematic configuration diagram of an image acquisition device according to a first embodiment of the present invention.

As shown in FIG. 1, an image acquisition device 1 according to this embodiment includes: an image-acquisition optical system 3 for forming a primary image of a subject S by focusing light from the subject S (object point); a microlens array 5 having a plurality of microlenses 5a that focus the light from the image-acquisition optical system 3; a phase filter (pupil modulation element) 7 for performing modulation of a phase distribution of the light that is to be made incident on the plurality of microlenses 5a via the image-acquisition optical system 3; a light receiving unit 9 provided with a plurality of light receiving elements 9a that receive the light focused by the plurality of microlenses 5a and that perform photoelectric conversion of the light; an adjusting unit 11 for switching the positional relationship between the plurality of light receiving elements 9a and the microlens array 5; a memory unit 13 for storing point image intensity distributions at the light receiving unit 9; and an arithmetic operation unit 15 for generating images.

As shown in FIG. 1, the microlens array 5 is composed of the plurality of microlenses 5a each having high convexity (positive power) on one surface on the opposite side from the subject S side. The plurality of microlenses 5a are arranged at the position of the primary image formed by the image-acquisition optical system 3 and are two-dimensionally arranged in directions intersecting the optical axis of the image-acquisition optical system 3.

The plurality of microlenses 5a are arranged at sufficiently large pitches, compared with the pitches of the light receiving elements 9a (e.g., pitches ten times the pitches of the light receiving elements 9a or more). Hereinafter, directions that are orthogonal to the optical axis of the image-acquisition optical system 3 and that are orthogonal to each other are referred to as the X direction and the Y direction, and a direction along the optical axis of the image-acquisition optical system 3 is referred to as the Z direction.

The phase filter 7 is formed of a glass material. In this phase filter 7, the glass material is coated with a polymer whose amount has been adjusted so as to produce a phase delay amount according to, for example, a cubic function in each of the X direction and the Y direction at the pupil of the image-acquisition optical system 3. By doing so, the phase filter 7 imparts a cubic-function phase distribution to the light having passed through the image-acquisition optical system 3 and extends the depth of field in, for example, normal observation.

The phase filter 7 can be furnished with a polymer shape exhibiting a desired phase distribution by producing, for example, a mold of the shape reverse to the shape of the phase distribution to be applied and by forming (transferring) the shape. In another producing method, a shape having a desired phase distribution may be achieved by directly processing the glass material, including achieving a shape by machining the glass material, forming a rough shape by cutting the glass material and then finishing the shape by polishing, and achieving a shape by grinding the surface of the glass material through, for example, laser processing. A polymer shape having a desired phase distribution may be achieved by layering materials with a 3D printer. Alternatively, a shape having a desired phase distribution may be achieved by imparting a phase difference by means of a transmissive device, such as a transmissive liquid crystal device, or imparting a phase difference by means of a reflective device, such as an LCOS (Liquid Crystal On Silicon, trademark) device.

The light receiving unit 9 is disposed so as to be movable in a direction along the optical axis of the image-acquisition optical system 3. The plurality of light receiving elements 9a are two-dimensionally arranged in directions intersecting the optical axis of the image-acquisition optical system 3, and a plurality of light receiving elements 9a are arranged for each region corresponding to a plurality of microlenses 5a of the microlens array 5. The plurality of light receiving elements 9a perform photoelectric conversion of detected light and output light intensity signals, serving as image information (first image information and second image information) about the subject S.

The adjusting unit 11 includes: a drive unit 17, such as a stepper motor or a piezo actuator, for moving the light receiving unit 9 in a direction along the optical axis of the image-acquisition optical system 3; and a control unit 19 for controlling etc. the drive unit 17.

For example, the control unit 19 includes: a CPU (Central Processing Unit); a main storage unit, such as a ROM (Read Only Memory) and a RAM (Random Access Memory); an auxiliary storage unit, such as an HDD (Hard Disk Drive); an input unit used by a user to input an instruction; an output unit for outputting data; an external interface for exchanging various types of data with external devices (none is shown in the figure), and so on. The auxiliary storage unit stores various types of programs, and various types of processing is performed as a result of the CPU reading programs from the auxiliary storage unit into the main storage unit, such as the RAM, and then executing the programs.

More specifically, the control unit 19 drives the drive unit 17 and switches between a first arrangement state, in which the light receiving unit 9 is disposed at the back focal positions of the microlenses 5a, and a second arrangement state, in which the light receiving unit 9 is disposed in the vicinities of the principal point positions of the microlenses 5a. In the first arrangement state, a light-field image can be acquired as a result of the plurality of light receiving elements 9a being arranged at the back focal positions of the microlenses 5a. In the second arrangement state, a normal two-dimensional image can be acquired as a result of the plurality of light receiving elements 9a being arranged in the vicinities of the principal point positions of the microlenses 5a.

When the first arrangement state is selected, the control unit 19 inputs, to the arithmetic operation unit 15, information indicating that the first arrangement state is selected, and when the second arrangement state is selected, the control unit 19 inputs, to the arithmetic operation unit 15, information indicating that the second arrangement state is selected. The control unit 19 sends, to the arithmetic operation unit 15, the light intensity signals output from the plurality of light receiving elements 9a of the light receiving unit 9.

The memory unit 13 stores a first point image intensity distribution, which indicates a point image intensity distribution for each position on the subject at the light receiving unit 9 in the first arrangement state, and a second point image intensity distribution, which indicates a point image intensity distribution of the subject S at the light receiving unit 9 in the second arrangement state. The first point image intensity distribution includes intensity distributions that differ for each position on the subject, whereas the second point image intensity distribution is one distribution that does not depend on the position on the subject.

In the case where information indicating that the first arrangement state is selected is input from the control unit 19 to the arithmetic operation unit 15, the arithmetic operation unit 15 uses the first point image intensity distribution stored in the memory unit 13 and applies predetermined first image processing for generating a light-field processed image (e.g., a 2D slice image or a 3D multislice image) to the light intensity signals sent from the control unit 19, thus generating a final image (first processed image).

In the case where information indicating that the second arrangement state is selected is input from the control unit 19 to the arithmetic operation unit 15, the arithmetic operation unit 15 does not perform the predetermined image processing for generating a light-field processed image but uses the second point image intensity distribution stored in the memory unit 13 and applies second image processing for generating a normal two-dimensional image to the light intensity signals sent from the control unit 19, thus generating a final image (second processed image).

The operation of the image acquisition device 1 with the above-described structure will be described with reference to the flowchart in FIG. 2.

When an image of the subject S is to be acquired with the image acquisition device 1 according to this embodiment, first the first arrangement state or the second arrangement state is selected by causing the control unit 19 to drive the drive unit 17 so as to adjust the position of the light receiving unit 9 in a direction along the optical axis of the image-acquisition optical system 3 (step SA1). When the first arrangement state is selected, information indicating that the first arrangement state is selected is input from the control unit 19 to the arithmetic operation unit 15. When the second arrangement state is selected, information indicating that the second arrangement state is selected is input from the control unit 19 to the arithmetic operation unit 15.

Light from the subject S is focused by the image-acquisition optical system 3, is incident on the microlens array 5 via the phase filter 7, and is focused by the plurality of microlenses 5a of the microlens array 5. Thereafter, light having passed through each of the microlenses 5a is received by a plurality of light receiving elements 9a of the light receiving unit 9 and is then subjected to photoelectric conversion. The light intensity signal produced as a result of the light being subjected to photoelectric conversion by each of the light receiving elements 9a is sent to the arithmetic operation unit 15.

In the arithmetic operation unit 15, an intensity distribution $I_m$ at the light receiving unit 9 is acquired on the basis of the light intensity signals sent from the light receiving unit 9 (step SA2).

Then, in the case where information indicating that the first arrangement state is selected is input from the control unit 19 ("YES" in step SA3), the arithmetic operation unit 15 applies, to the acquired intensity distribution $I_m$, the predetermined first image processing for generating a light-field processed image (step SA4).

The first image processing in step SA4 will be described with reference to the flowchart in FIG. 3.

First of all, the arithmetic operation unit 15 reads, from the memory unit 13, the first point image intensity distribution, which indicates a point image intensity distribution for each position on the subject at the light receiving unit 9 in the first arrangement state (step SB1). Here, a process for individually setting regions of the subject S to be analyzed may be provided.

Next, the arithmetic operation unit 15 specifies a subject luminance distribution as an initial value (step SB2). Then, the arithmetic operation unit 15 calculates an intensity distribution $I^{(n)}_S$ of the light receiving unit 9 on the basis of the first point image intensity distribution that has been read out in step SB1 and the subject luminance distribution that has been specified in step SB2 (step SB3).

Figure 2:
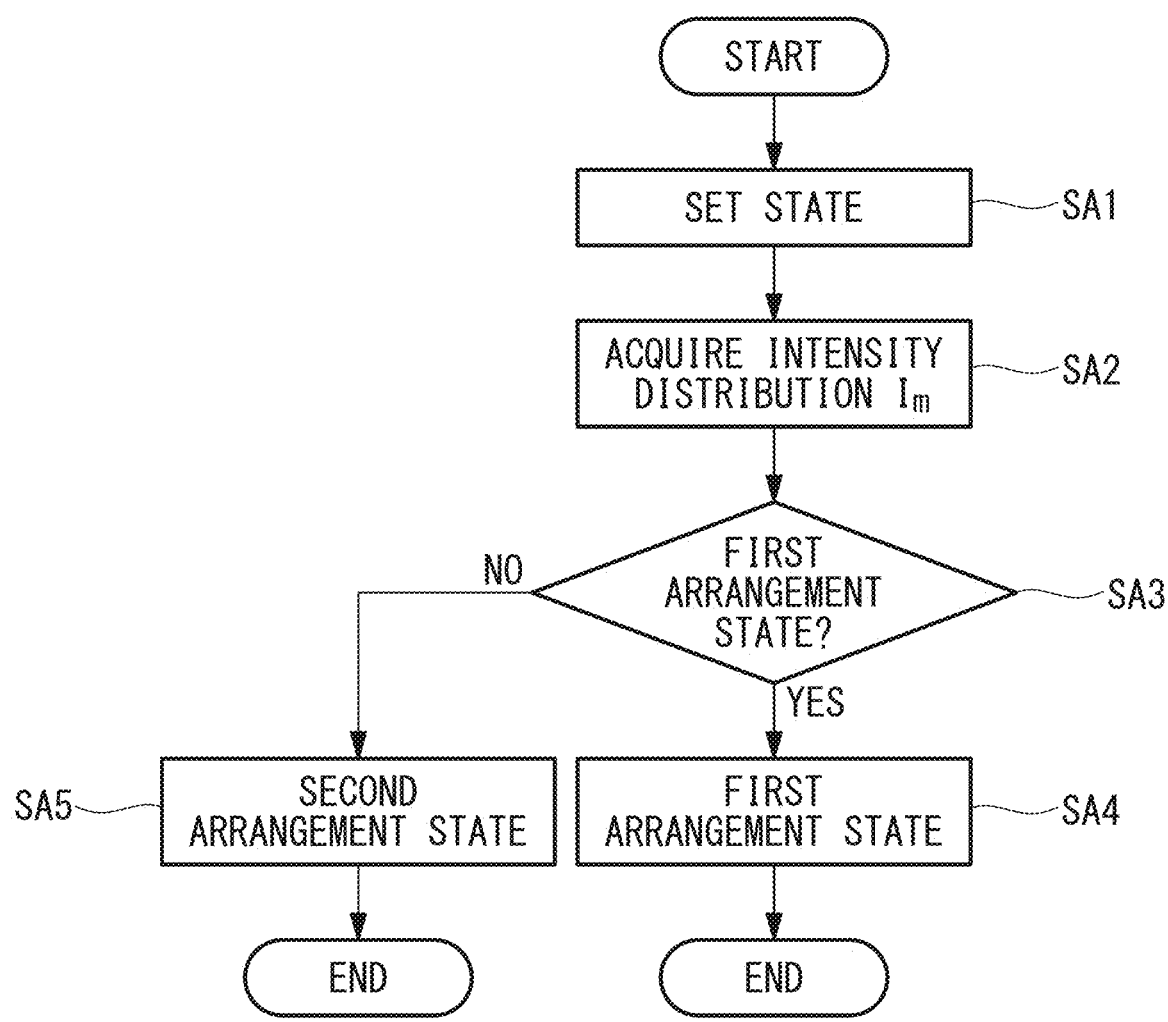
FIG. 2 is a flowchart for illustrating the process of acquiring images of a subject by means of the image acquisition device in FIG. 1.
Figure 3:
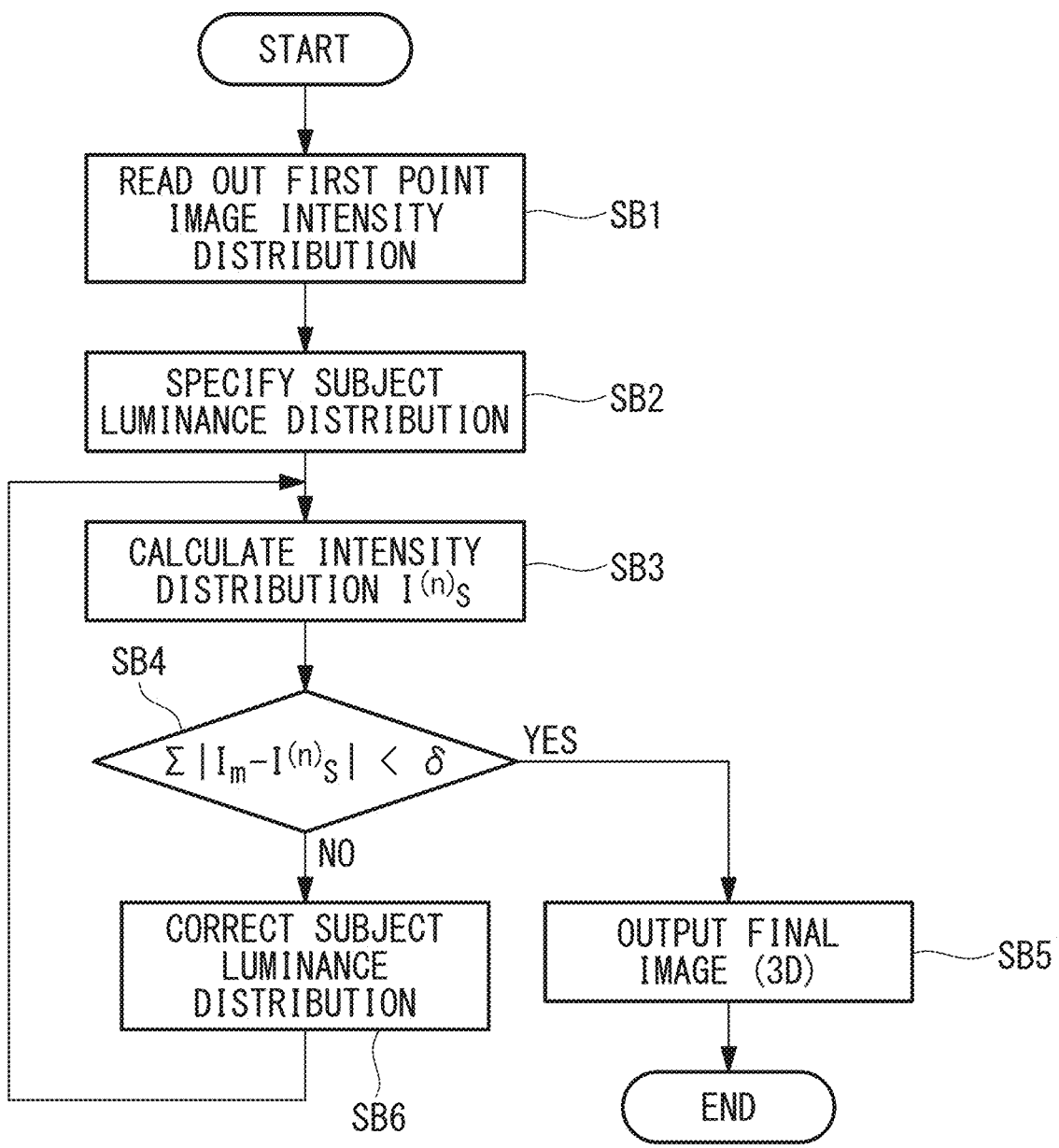
FIG. 3 is a flowchart for illustrating first image processing in step SA4 of the flowchart in FIG. 2.

Next, the arithmetic operation unit 15 compares the intensity distribution $I_m$ acquired in step SA2 of the flowchart in FIG. 2 with the intensity distribution $I^{(n)}{}_S$ calculated in step SB3 of the flowchart in FIG. 3 (step SB4).

In the case where the absolute value of the amount of an error (difference) between the intensity distribution $I_m$ and the intensity distribution $I^{(n)}{}_S$ is smaller than a constant value ($\sigma$), the intensity distribution $I^{(n)}{}_S$ is output after being imaged as information about the three-dimensional distribution of the subject S (step SB5). Imaging is not necessarily required, and a signal indicating information about the three-dimensional distribution of the subject S may be output.

On the other hand, in the case where the absolute value of the amount of an error (difference) between the intensity distribution $I_m$ and the intensity distribution $I^{(n)}{}_S$ is equal to or larger than the constant value ($\sigma$), the arithmetic operation unit 15 corrects the subject luminance distribution specified as the initial value (step SB6), and the flow returns to step SB3, where the intensity distribution $I^{(n)}{}_S$ of the light receiving unit 9 is calculated again. Then, the processes from step SB3 to step SB6 are repeated until the absolute value of the amount of an error (difference) between the intensity distribution $I_m$ and the intensity distribution $I^{(n)}{}_S$ becomes smaller than the constant value ($\sigma$).

Returning to the flowchart in FIG. 2, in the case where information indicating that the second arrangement state is selected is input from the control unit 19 in step SA3, the arithmetic operation unit 15 applies, to the acquired intensity distribution $I_m$, the second image processing for generating a normal two-dimensional image (step SA5).

The second image processing in step SA5 will be described with reference to the flowchart in FIG. 4.

First of all, the arithmetic operation unit 15 reads the second point image intensity distribution, which indicates a point image intensity distribution of the subject S at the light receiving unit 9 in the second arrangement state (step SC1). Here, the subject S may be divided into a plurality of regions according to the image height so that point image intensity distributions that differ for each of the regions are available.

Next, the arithmetic operation unit 15 performs a 2D deconvolution arithmetic operation. The 2D deconvolution arithmetic operation is performed on the basis of, for example, expression (1) below.

$$\mathrm{FFT}^{-1}\{\mathrm{FFT}(I_m)/\mathrm{FFT}(\mathrm{PSF})\} \quad (1)$$

More specifically, the intensity distribution $I_m$ acquired in step SA2 of the flowchart in FIG. 2 is subjected to a Fourier transform (FFT, Fast Fourier Transform), thereby calculating a spatial frequency distribution of the intensity distribution $I_m$. The second point image intensity distribution (PSF, Point Spread Function) that has been read out in step SC1 of the flowchart in FIG. 3 is subjected to a Fourier transform (FFT), thereby calculating a spatial frequency distribution (MTF: Modulation Transfer Function, spatial frequency characteristics) of the second point image intensity distribution. Then, the calculated spatial frequency distribution of the intensity distribution $I_m$ is divided by the spatial frequency distribution of the second point image intensity distribution, and the result is then subjected to an inverse Fourier transform ($\mathrm{FFT}^{-1}$). By doing so, a normal two-dimensional image of the subject S is generated and output (step SC3).

As described above, according to the image acquisition device 1 of this embodiment, when the adjusting unit 11 selects the first arrangement state, and the light receiving unit 9 receives, via the microlens array 5, light that has come from the subject S and whose phase distribution has been modulated by the phase filter 7, a high-definition light-field image can be acquired. On the other hand, when the adjusting unit 11 selects the second arrangement state, and the light receiving unit 9 receives, via the microlens array 5, light that has come from the subject S and whose phase distribution has been modulated by the phase filter 7, a normal two-dimensional image with an extended depth of field can be acquired. Therefore, it is possible to acquire a plurality of images that produce mutually different effects for the user with a simple configuration for merely switching between the first arrangement state and the second arrangement state by using the adjusting unit 11.

Figure 5:
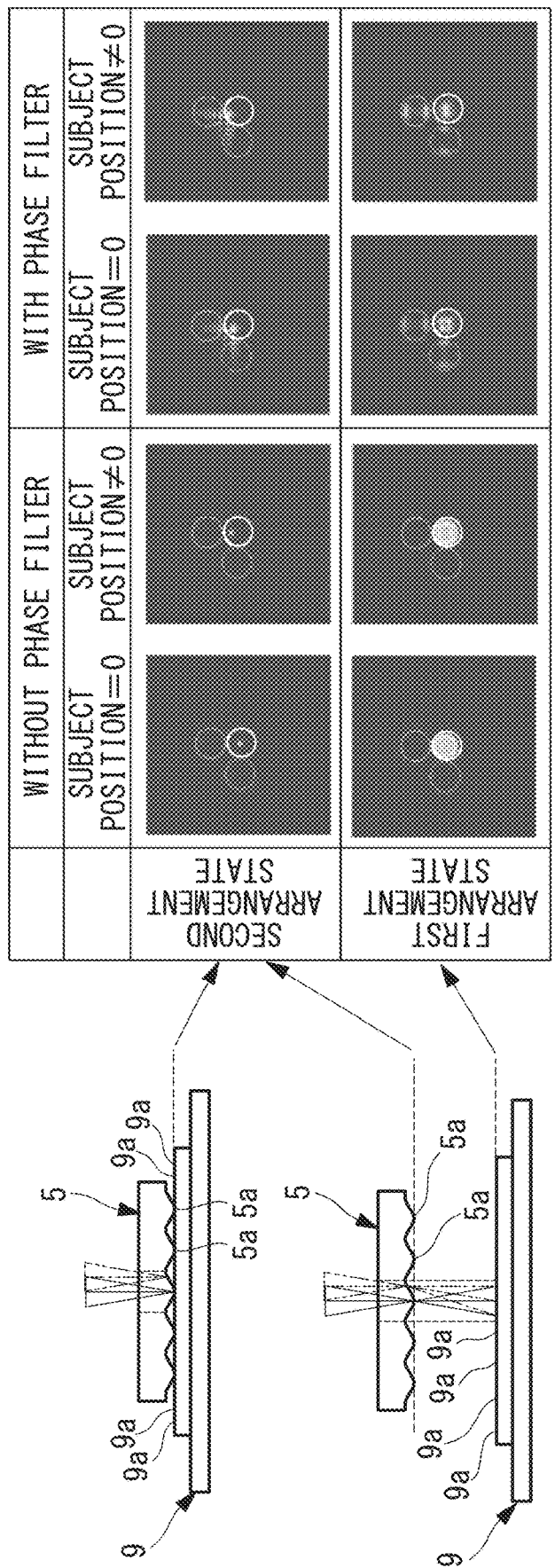
FIG. 5 is a diagram for illustrating the relationship among the presence/absence of a phase filter, a first point image intensity distribution, and a second point image intensity distribution.

Here, the relationship between the presence/absence of the phase filter 7 and the second point image intensity distribution will be described with reference to FIG. 5. FIG. 5 shows examples of the point image intensity distributions depending on the presence/absence of the phase filter 7 and the position on the subject S, in the case of the first arrangement state and in the case of the second arrangement state. The three circles in each of the point image intensity distributions show one example of the spaces of some microlenses 5a.

In the case where the phase filter 7 is absent, the dot-like intensity distribution, at the light receiving unit 9, of the light from the subject S in the second arrangement state shows a general PSF (point spread function). On the other hand, in the case where the phase filter 7 is present, the second point image intensity distribution takes an asymmetrically widened shape due to an asymmetric phase distribution on the pupil plane of the image-acquisition optical system 3.

Also, when the position on the subject S changes in the X direction and Y direction, the second point image intensity distribution shifts similarly, as shown in FIG. 5, by an amount equal to the applied lateral magnification. Therefore, basically, the shape of the second point image intensity distribution does not change depending on the image height (shift invariant), regardless of the presence/absence of the phase filter 7, and the image at the light receiving unit 9 is represented by a deconvolution between the luminance distribution of the subject S and the point image intensity distribution. It is well known that if the position on the subject S changes in the Z direction, the change in the shape, within the XY plane, of the second point image intensity distribution is small, compared with the case where the phase filter 7 is absent.

When a cubic-function phase distribution is imparted by the phase filter 7 as in this embodiment, the spatial frequency components are characterized by not having a 0 point at the cutoff frequency of the original point image intensity distribution, though the spatial spread of the second point image intensity distribution becomes wide compared with the case where the phase filter 7 is absent.

Thus, high-frequency components can be corrected by applying deconvolution processing with the reciprocal of the MTF obtained from the second point image intensity distribution, as shown in expression (1), as long as the SN at the light receiving unit 9 allows this. Because an image-height-dependent change in the point image intensity distribution occurs due to the influence of various types of aberration in the same manner as in normal optical systems, the region may be divided for each image height so that deconvolution processing can be applied by using different point image intensity distributions.

Next, the relationship between the presence/absence of the phase filter 7 and the first point image intensity distribution will be described with reference to FIG. 5.

The use of an appropriate phase filter 7 allows the first point image intensity distribution to take on different point image intensity distributions so as to cope with a minute displacement of the subject, said displacement corresponding to a shift in one microlens array 5. For this reason, the first point image intensity distribution takes on different point image intensity distributions according to the incident position on the microlenses 5a and the conjugate position in the direction along the optical axis (Z direction).

Therefore, for the first point image intensity distribution, different point image intensity distributions are prepared for each position on the subject, instead of using a single point image intensity distribution, such that the size of each of the microlenses 5a is treated as a unit in the planar direction of the microlens array 5 and such that the subject distance range used for analysis is divided into an appropriate number of sub-ranges in the direction along the optical axis (Z direction) of the microlens array 5.

A three-dimensional image of the subject S can be obtained by using this group of point image intensity distributions as the first point image intensity distribution and by applying three-dimensional optimization processing (repeated arithmetic operations) to the acquired intensity distribution $I_m$. In other words, the luminance distribution of the subject S is estimated from the plurality of intensity distributions received from the subject S on the basis of the well-known information that light from different points produces different distributions.

A method such as the Richardson-Lucy algorithm, machine learning, and deep learning may be employed, instead of the 3D deconvolution method from step SB2 to step SB5 of the flowchart in FIG. 3. Regularization processing may be incorporated. In the conditional determination unit in step SB4, the number of repetitions may be preset so that the flow exits the loop when the number of processes reaches a certain value.

Figure 4:
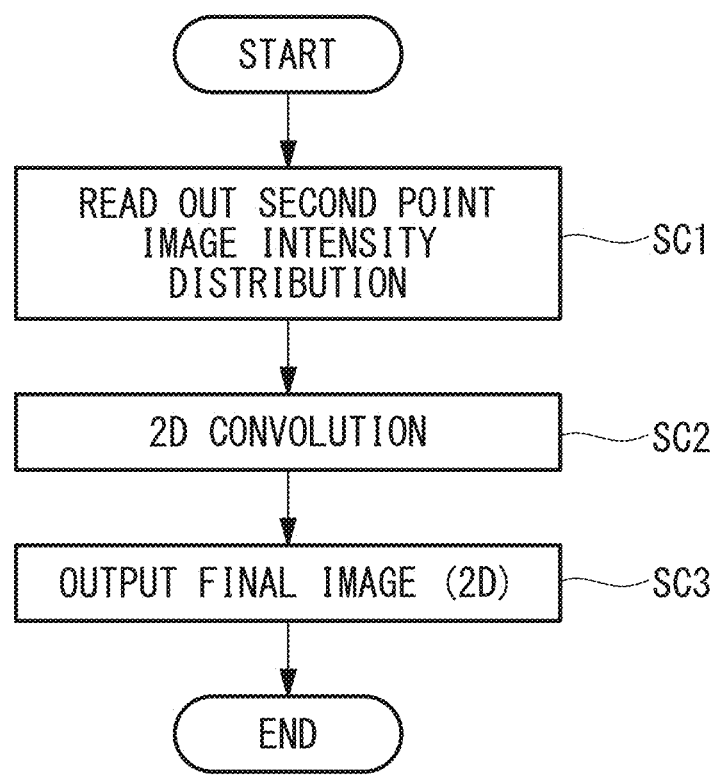
FIG. 4 is a flowchart for illustrating second image processing in step SA5 of the flowchart in FIG. 2.

Instead of the 2D deconvolution method in step SC2 of the flowchart in FIG. 4, for example, a restoration filter may be preliminarily produced by using the second point image intensity distribution, and furthermore, a least squares filter (Wiener filter) or other regularization processing may be incorporated in order to increase robustness against measurement noise.

In some optical systems assuming deconvolution, such as extension of the depth of field, Fisher information is used as an analysis method. In general, Fisher information is a quantity used in statistics or information theory, indicating information about a random variable with respect to a population parameter. It is known that the reciprocal of this amount gives the lower limit of the variance of an invariant estimator of the population parameter (Cramér-Rao inequality).

Let us consider that Fisher information is applied to the image acquisition device 1. When a point image intensity distribution is standardized with the total amount of the distribution (standardized point image intensity distribution), this standardized point image intensity distribution can be regarded as a random variable (probability density function) indicating which of the plurality of light receiving elements 9a the light coming from one point on the subject S reaches. Because the X, Y, and Z coordinates of the subject S are parameters for changing the shape of the probability density function (point image intensity distribution), the X, Y, and Z coordinates can be regarded as the population parameters of this random variable. Therefore, Fisher information, serving as a response of the optical system, is an amount suggesting with what degree of variance the subject coordinates, serving as the population parameters, can be reproduced, but more intuitively, is an amount including differential values of the point image intensity distribution with respect to the subject position coordinates, thus giving the sensitivity of the optical system in response to a displacement of the subject S.

Figure 6:
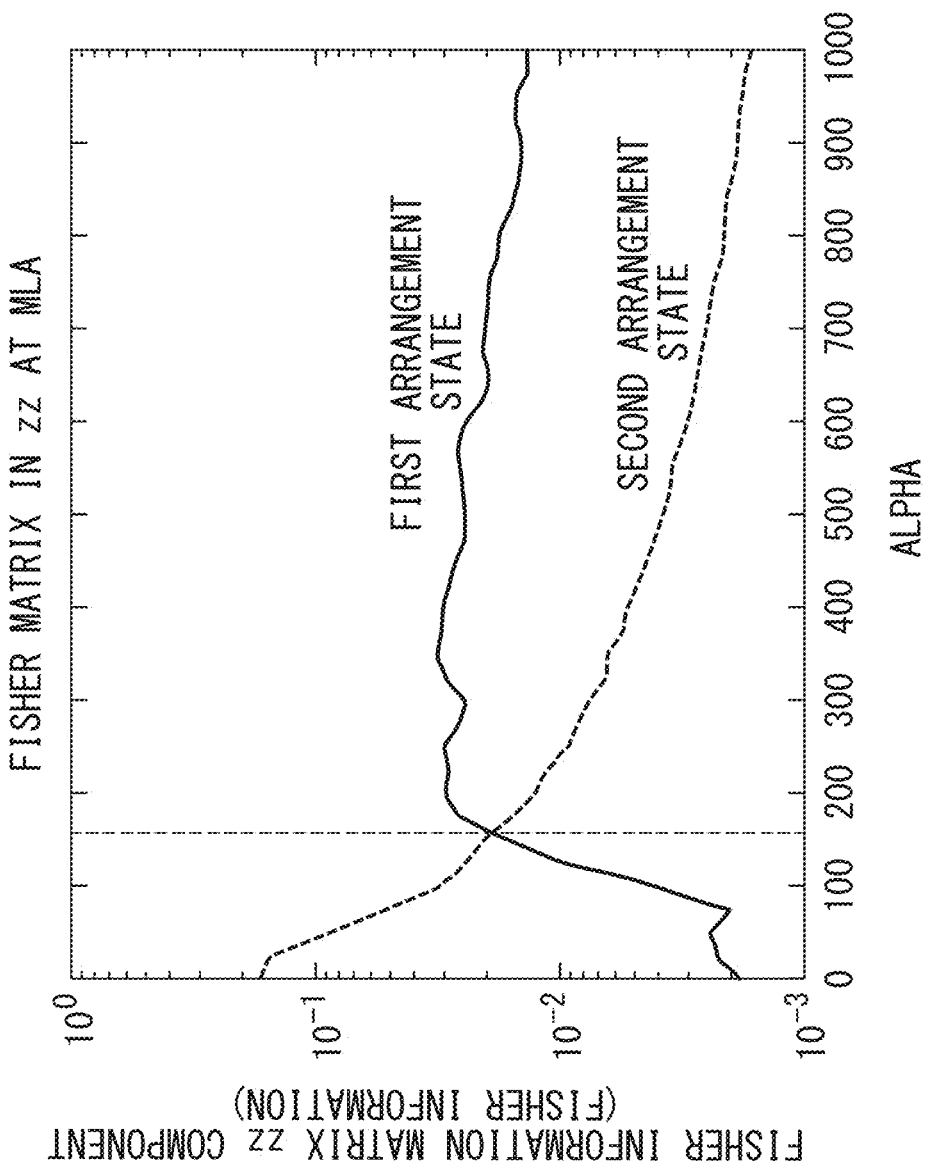
FIG. 6 is a graph for illustrating analysis using Fisher information.

FIG. 6 shows components, of Fisher information (Fisher information matrix), at subject position coordinates in a direction along the optical axis (vicinity of the in-focus position). In the case where the phase filter 7 is absent (position 0 on the horizontal axis in FIG. 6), the value of Fisher information in the second arrangement state largely exceeds the value of Fisher information in the first arrangement state. As the coefficient of the phase amount of the phase filter 7 is increased, the Z sensitivity in the first arrangement state increases (higher-definition reconstructed three-dimensional image), and the Z sensitivity in the second arrangement state decreases (effect of extending the depth of field). When the coefficient of the phase amount of the phase filter 7 is equal to or larger than a certain amount, the values are reversed.

In a region in which the coefficient of the phase amount of the phase filter 7 is equal to or larger than the certain amount, i.e., in the region on the drawing to the right of the position indicated by the chain line between 100 and 200 on the horizontal axis in FIG. 6, both a high-definition three-dimensional image in the first arrangement state and an EDOF (Extended Depth of Field) image having a depth of field equal to or larger than the Z resolution of this three-dimensional image can be acquired with a single device. In other words, conditional expression (3) below is satisfied in this case.

$$\Delta Z_1/\Delta Z_2 < 1 \quad (3)$$

Here, $\Delta Z_1$ is the subject depth resolution of the light-field processed image acquired in the first arrangement state, and $\Delta Z_2$ is the depth of field of the normal two-dimensional image acquired in the second arrangement state. Note that $\Delta Z_1$ and $\Delta Z_2$ may be obtained by actually measuring a subject that is smaller than the resolution of the optical system.

Second Embodiment

Next, an image acquisition device according to a second embodiment of the present invention will now be described with reference to the drawings.

Figure 7:
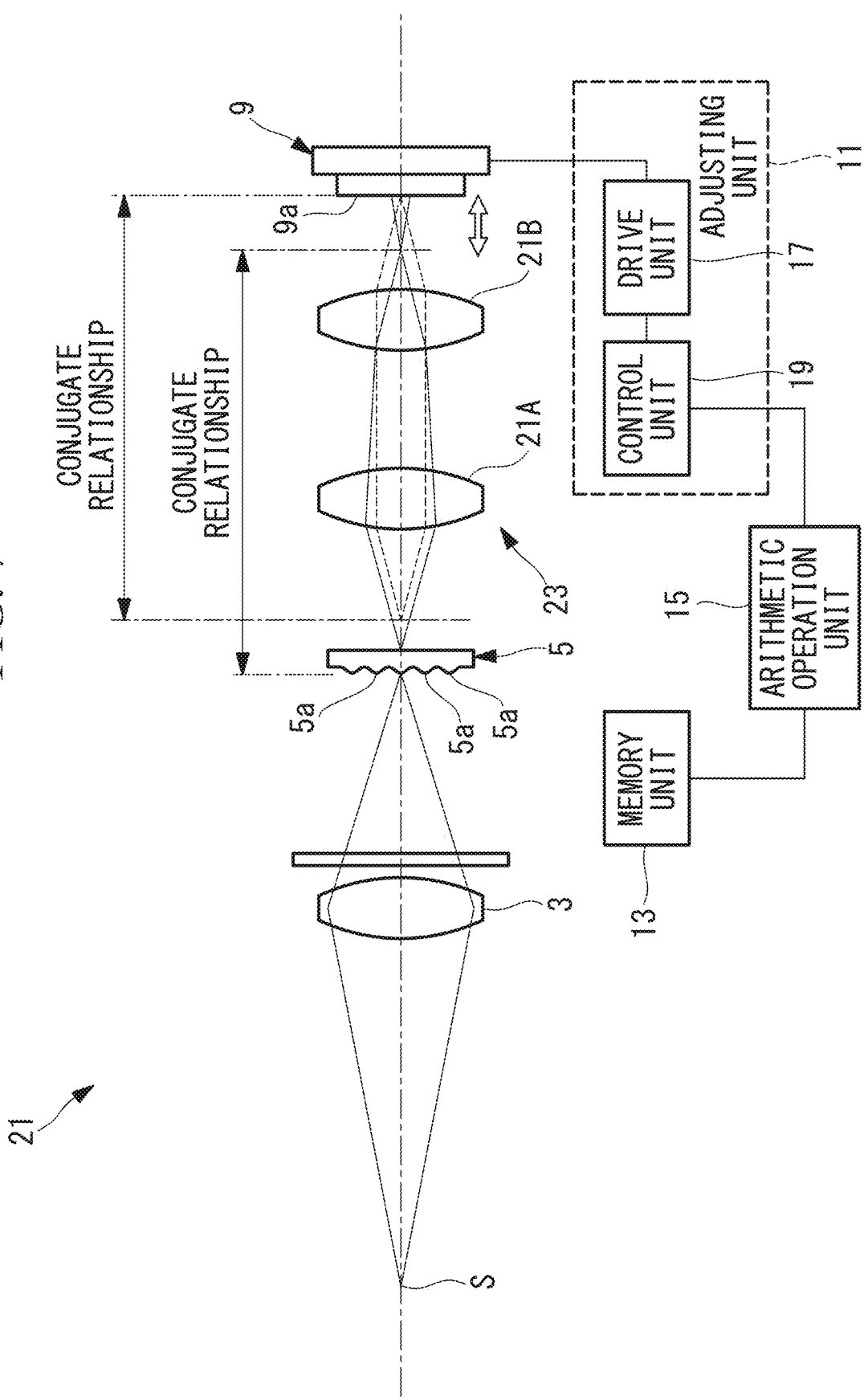
FIG. 7 is a schematic configuration diagram of an image acquisition device according to a second embodiment of the present invention.

As shown in FIG. 7, an image acquisition device 21 according to this embodiment differs from the first embodiment in that the image acquisition device 21 includes a relay optical system 23 that forms a secondary image by reforming the primary image by relaying, to the light receiving unit 9, the light focused by the plurality of microlenses 5a.

In the description of this embodiment, the same components as those in the image acquisition device 1 according to the above-described first embodiment are denoted by the same reference signs, and descriptions thereof will be omitted.

As shown in FIG. 7, in this embodiment, the microlens array 5 is disposed such that the plurality of microlenses 5a having high convexity (positive power) are oriented towards the subject S side.

The relay optical system 23 is composed of a plurality of (two in this embodiment) lenses 24A and 24B. The relay optical system 23 is telecentric at least on the secondary image side in the first arrangement state.

In this embodiment, the control unit 19 drives the drive unit 17 and switches between the first arrangement state, in which the plurality of light receiving elements 9a of the light receiving unit 9 are arranged at the positions conjugate to the back focal positions of the microlenses 5a, and the second arrangement state, in which the plurality of light receiving elements 9a of the light receiving unit 9 are arranged at the positions conjugate to the principal point positions of the microlenses 5a.

In the first arrangement state, a light-field image is acquired as a result of the plurality of light receiving elements 9a being arranged at the positions conjugate to the back focal positions of the microlenses 5a. In this case, because information indicating that the first arrangement state is selected is input from the control unit 19 to the arithmetic operation unit 15, the arithmetic operation unit 15 uses the first point image intensity distribution stored in the memory unit 13 and applies first image processing to the light intensity signals sent from the control unit 19, thus generating a light-field processed image.

On the other hand, in the second arrangement state, a normal two-dimensional image is acquired as a result of the plurality of light receiving elements 9a being arranged at the positions conjugate to the principal point positions of the microlenses 5a. In this case, because information indicating that the second arrangement state is selected is input from the control unit 19 to the arithmetic operation unit 15, the arithmetic operation unit 15 uses the second point image intensity distribution stored in the memory unit 13 and applies second image processing to the light intensity signals sent from the control unit 19, thus generating a normal two-dimensional image.

As described above, according to the image acquisition device 21 of this embodiment, by causing the relay optical system 23 to relay the light having passed through each of the microlenses 5a, each of the light receiving elements 9a and the back focal position of each of the microlenses 5a can be arranged at conjugate positions in the first arrangement state, and each of the light receiving elements 9a and the principal point position of each of the microlenses 5a can be arranged at conjugate positions in the second arrangement state. This allows the first arrangement state and the second arrangement state to be easily selected without causing the optical systems to interfere with each other. Therefore, similarly to the image acquisition device 1 according to the first embodiment, both a light-field image and a normal two-dimensional image can be acquired merely by causing the adjusting unit 11 to switch between the first arrangement state and the second arrangement state.

Figure 8:
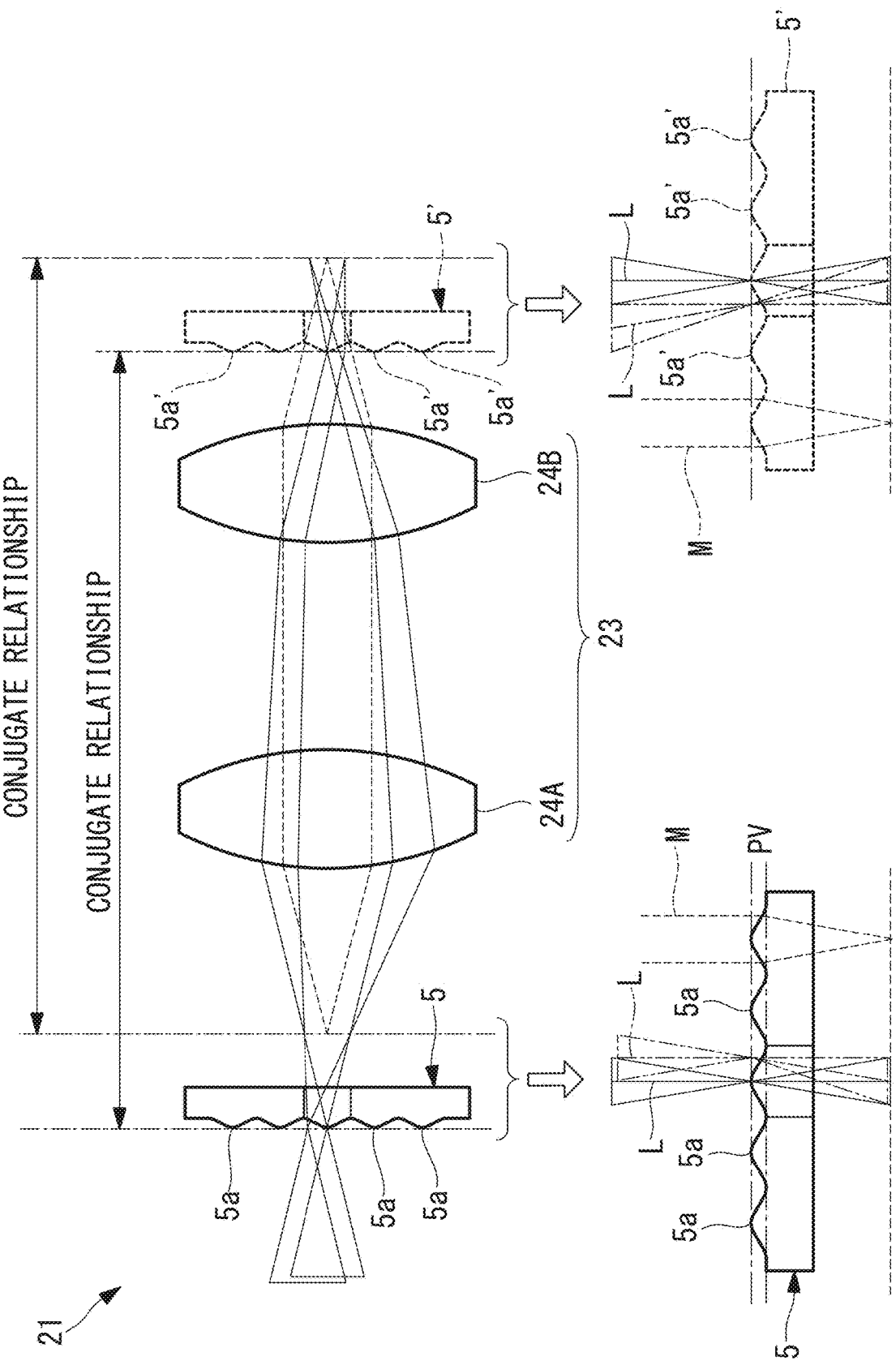
FIG. 8 is a diagram depicting one example of refraction of light at microlenses and refraction of light at the projection plane of the microlenses projected by a relay optical system in FIG. 7.

Here, as shown in FIG. 8, a light beam (wavefront) that is actually incident on the microlens array 5 is subjected to refraction at the front/back surfaces of each of the microlenses 5a. On the other hand, although the behavior of a light beam projected by the relay optical system 23 is similar to the behavior in the vicinity of a microlens 5a, no refraction actually occurs at a projection plane 5a', of the microlens 5a, projected by the relay optical system 23.

For this reason, equivalent wavefronts are achieved in the first arrangement state, but equivalent wavefronts are not achieved in the second arrangement state, hence forming an image reflecting spherical aberration that has occurred at, for example, the back surface of the microlens 5a and that remains in the relay space. In FIG. 8, reference sign L denotes principal rays, reference sign M denotes a light beam emitted from one point of the pupil of the image-acquisition optical system 3, and reference sign 5' denotes microlenses projected by the relay optical system 23.

Thus, in this embodiment, it is preferable that the plurality of microlenses 5a have a surface shape that satisfies expression (2) below.

$$PV/\lambda < \{M/(NA_{ob})\}^2 \qquad (2)$$

Here, PV is the distance along the optical axis from the position closest to the subject S to the position furthest from the subject S, said positions being on the power surface of a microlens 5a, M is the lateral magnification of the image-acquisition optical system 3, $NA_{ob}$ is the subject S side numerical aperture of the image-acquisition optical system 3, and λ is the wavelength of light that comes from the subject S and that is incident on the image-acquisition optical system 3.

As a result of the surface shapes of the plurality of microlenses 5a satisfying expression (2), the refraction at the power surface of the microlens array 5 is also imparted in a planar manner in the second arrangement state. By doing so, in the second arrangement state, the wavefronts on the power surface in the projection space can more appropriately reflect the actual wavefronts on the surface of the microlenses 5a, thereby allowing the acquisition of a high-definition two-dimensional image.

As a result of the microlens array 5 being arranged such that the high-convexity surfaces of the plurality of microlenses 5a are oriented towards the subject S side, a higher-definition light-field image can be acquired in the first arrangement state. In particular, this is preferable in terms of aberration.

Figure 9:
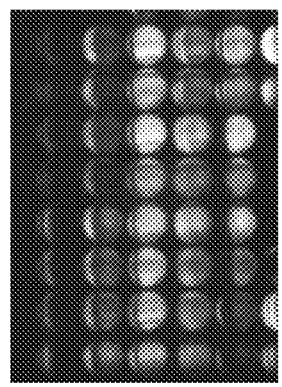
FIG. 9 is a diagram depicting one example of an image acquired in a first arrangement state.

Here, in the case of image acquisition in the first arrangement state, the light receiving unit 9 has a positional relationship conjugate to the (exit) pupil with respect to the subject S located at the object position conjugate to the microlens array 5 (in-focus position in a normal optical system). Therefore, both the subject S conjugate to an end section of one microlens 5a and the subject S conjugate to the center section of the microlens 5a produce substantially similar intensity distributions. For this reason, as shown in FIG. 9, the sampling in the subject space is determined by the space between microlenses 5a of the microlens array 5, making it is impossible to directly observe a structure equal to or smaller in size than a microlens 5a.

Figure 10:
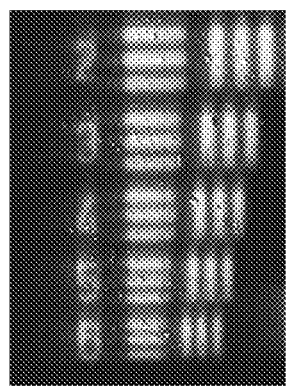
FIG. 10 is a diagram depicting one example of an image acquired in a second arrangement state.

On the other hand, in the second arrangement state, a structure equal to or smaller in size than a microlens 5a can be directly observed as a result of the light receiving unit 9 being disposed at a position at which the power of the microlens array 5 is substantially cancelled out, as shown in FIG. 10.

Figure 11:
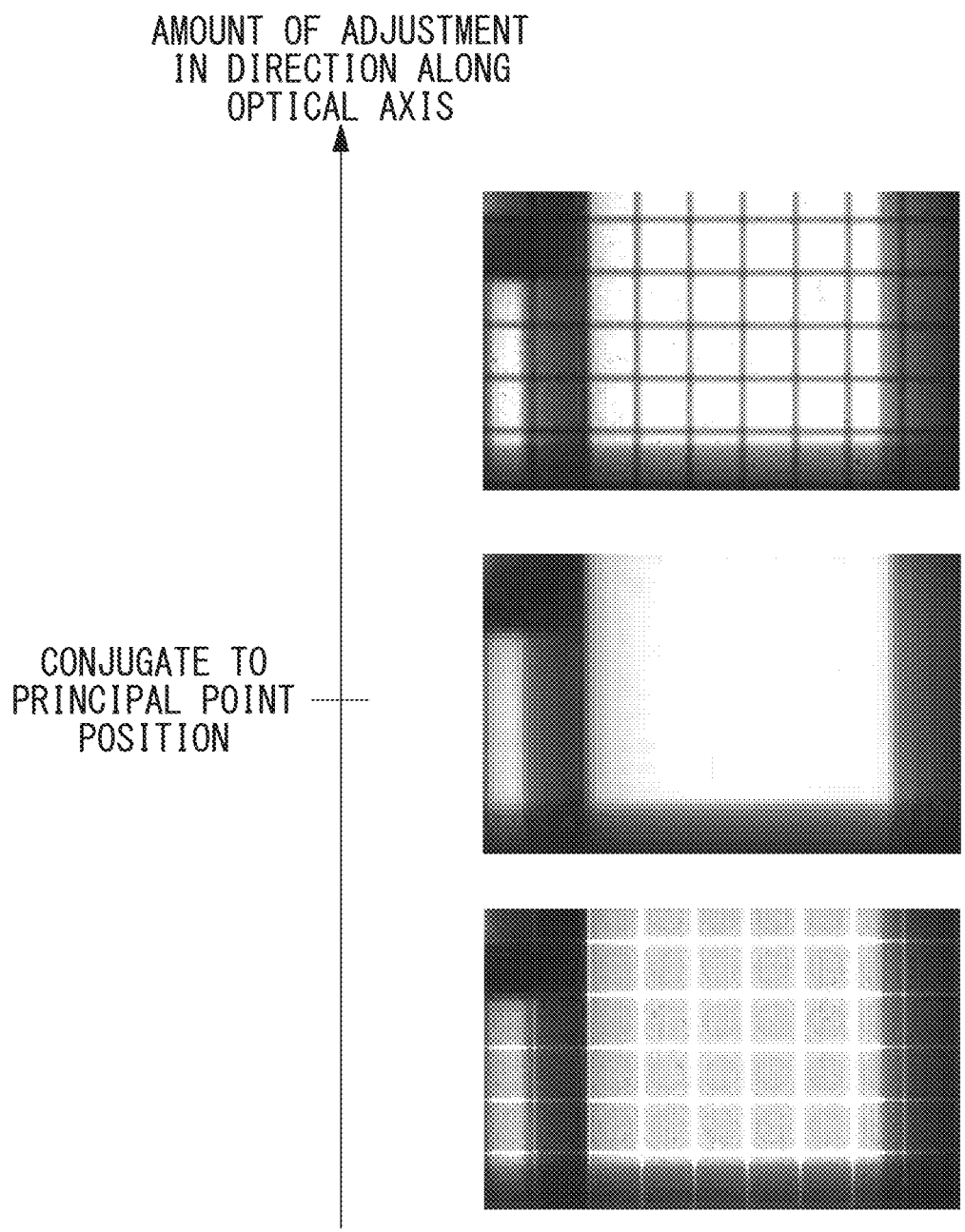
FIG. 11 is a diagram depicting examples of an image in the case where a plurality of light receiving elements and principal point positions of the microlenses have a conjugate positional relationship and images in the case where the plurality of light receiving elements are slightly shifted from the principal point positions of the microlenses in a direction along an optical axis.

For image acquisition in the second arrangement state, an image may be acquired by slightly moving the light receiving unit 9 back and forth from the principal point positions of the microlenses 5a in the direction (Z direction) along the optical axis, as shown in FIG. 11. By doing so, the contrast of the boundary between neighboring microlenses 5a can be inverted. Therefore, it is possible to generate an image closer to an image in a normal image acquisition state by image processing for subtracting the influence of the boundary between neighboring microlenses 5a.

As shown in FIG. 11, in the case where the plurality of light receiving elements 9a and the principal point positions of the microlenses 5a are arranged so as to be conjugate to each other (second arrangement state), it is possible to confirm that the influence of the boundary between neighboring microlenses 5a can also be negligible in a single image acquisition. Moreover, even in the case where the image-acquisition optical system 3 and the relay optical system 23 suffer field curvature etc., an image having excellent quality over the entire area can be acquired by slightly moving the light receiving unit 9 back and forth from the principal point positions of the microlenses 5a in a direction along the optical axis.

Figure 12:
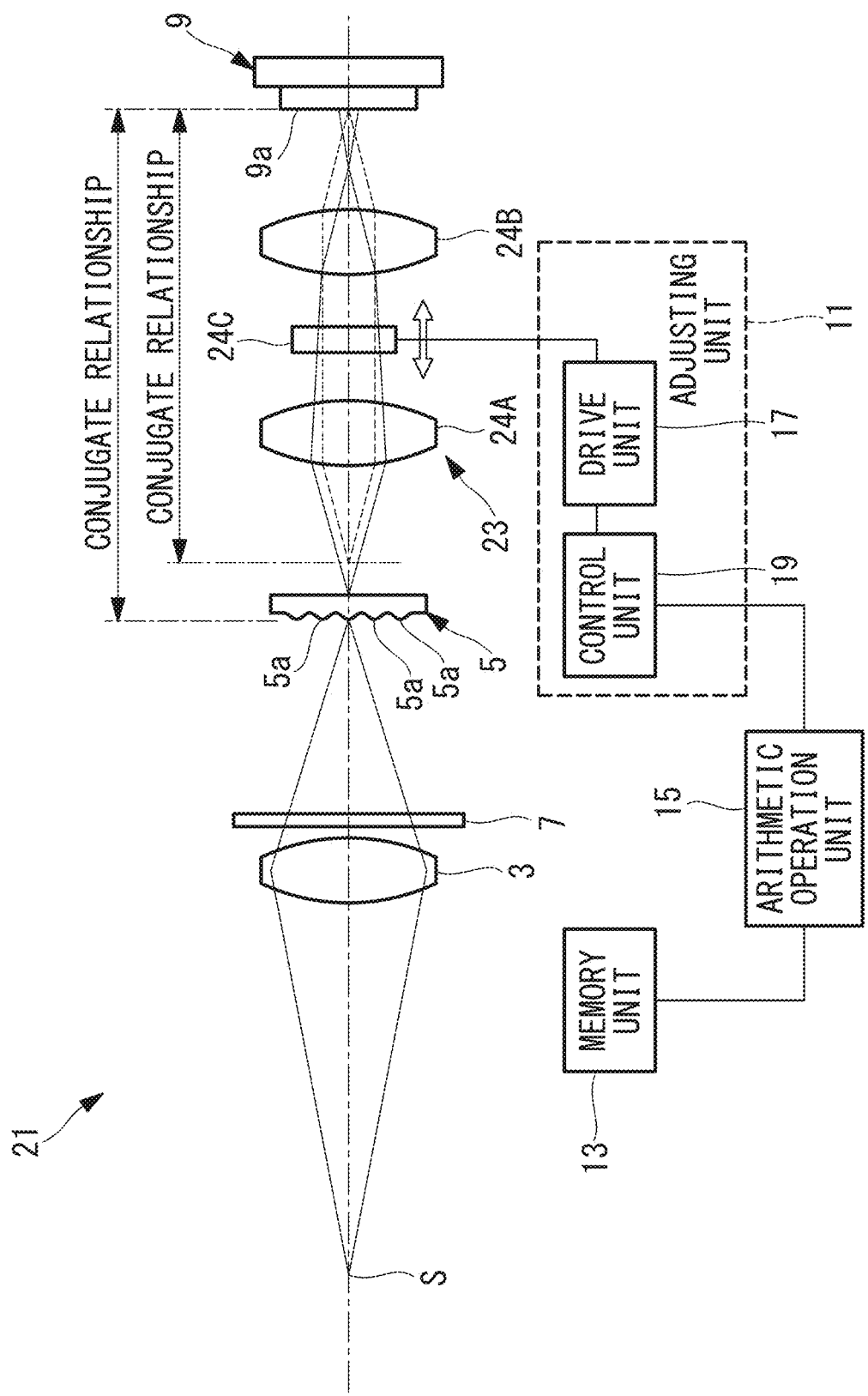
FIG. 12 is a schematic configuration diagram of an image acquisition device according to a modification of the second embodiment of the present invention.

In this embodiment, switching between the first arrangement state and the second arrangement state is performed by causing the drive unit 17 to move the light receiving unit 9. Instead of this, as shown in, for example, FIG. 12, the relay optical system 23 may include, besides the lenses 24A and 24B, a focus lens group (lenses) 24C movable in a direction along the optical axis of the relay optical system 23, so that switching between the first arrangement state and the second arrangement state is performed by causing the drive unit 17 to move the focus lens group 24C in a direction (Z direction) along the optical axis of the relay optical system 23.

In this case, it is possible to acquire a light-field image by causing the drive unit 17 to move the position of the focus lens group 24C so as to achieve the first arrangement state, in which the plurality of light receiving elements 9a and the back focal positions of the microlenses 5a have a conjugate positional relationship. It is possible to acquire a normal two-dimensional image by causing the drive unit 17 to move the position of the focus lens group 24C so as to achieve the second arrangement state, in which the plurality of light receiving elements 9a and the principal point positions of the microlenses 5a have a conjugate positional relationship.

Therefore, both a light-field image and a normal two-dimensional image can be acquired by switching between the first arrangement state and the second arrangement state without moving the light receiving unit 9 in a direction along the optical axis of the relay optical system 23.

Third Embodiment

Figure 13:
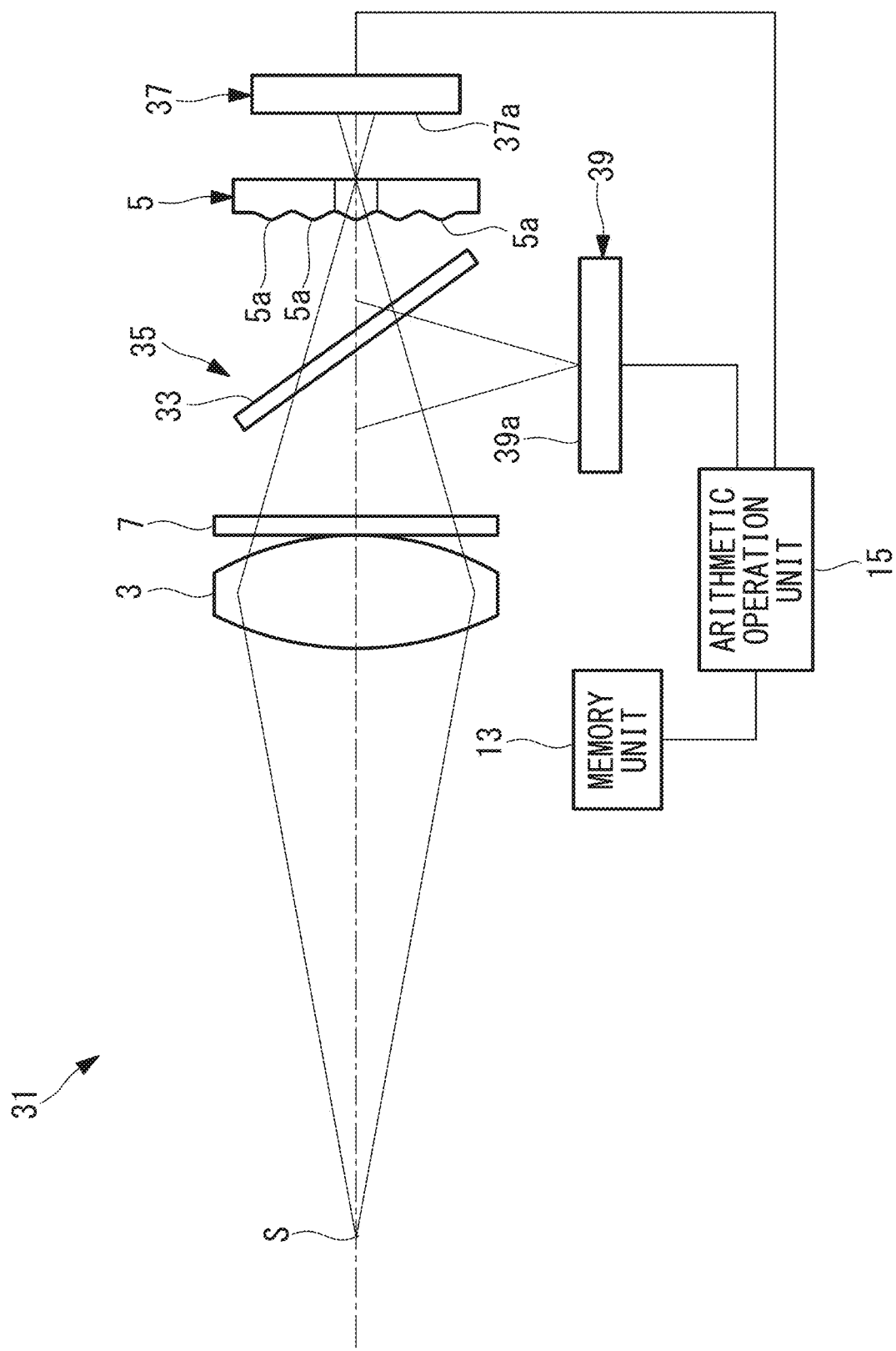
FIG. 13 is a schematic configuration diagram of an image acquisition device according to a third embodiment of the present invention.

As shown in FIG. 13, an image acquisition device 31 according to a third embodiment of the present invention differs from the first embodiment in that the image acquisition device 31 includes, instead of the adjusting unit 11, an adjusting unit 35 provided with an optical element (optical path splitting unit) 33 for splitting the optical path of the light that has come from the subject S and that has passed through the phase filter 7 and in that the image acquisition device 31 includes, instead of the light receiving unit 9, a first light receiving unit 37 having a plurality of first light receiving elements 37a arranged at the back focal positions of the microlenses 5a and a second light receiving unit 39 having a plurality of second light receiving elements 39a arranged at the position of another primary image formed in another optical path split off by the optical element 33.

In the description of this embodiment, the same components as those in the image acquisition device 1 according to the above-described first embodiment are denoted by the same reference signs, and descriptions thereof will be omitted.

In this image acquisition device 31, the exit pupil of the image-acquisition optical system 3 is located on the subject S side with respect to the optical element 33, and the phase filter 7 is disposed at the position of the exit pupil.

In this embodiment, the plurality of microlenses 5a of the microlens array 5 are arranged at the position of the primary image formed in one optical path split off by the optical element 33. As shown in FIG. 13, the microlens array 5 is disposed such that the plurality of microlenses 5a having high convexity (positive power) are oriented towards the subject S side.

According to the ratio of transmittance and reflectance, the optical element 33 transmits a portion of the light from the phase filter 7 towards the microlens array 5 and the first light receiving unit 37 on one hand and reflects the rest of the light from the phase filter 7 towards the second light receiving unit 39 on the other hand. For this optical element 33, for example, a beam splitter (half mirror) having the same proportion of transmittance and reflectance, a beam splitter having different proportions of transmittance and reflectance, or a dichroic mirror is used.

Of the light having passed through the phase filter 7, the light in the one optical path having passed through the optical element 33 is received by the plurality of first light receiving elements 37a of the first light receiving unit 37 arranged at the back focal positions of the microlenses 5a. On the other hand, of the light having passed through the phase filter 7, the light in the other optical path reflected by the optical element 33 is received by the plurality of second light receiving elements 39a of the second light receiving unit 39 arranged at the position of the other primary image formed in the other optical path, i.e., at the positions corresponding to the vicinities of the principal point positions of the microlenses 5a. Therefore, the adjusting unit 35 can switch between the first arrangement state and the second arrangement state by splitting the optical path of the light from the phase filter 7 by means of the optical element 33.

In this embodiment, the light intensity signals output from the first light receiving unit 37 and the light intensity signals output from the second light receiving unit 39 are input to the arithmetic operation unit 15. The arithmetic operation unit 15 generates a light-field processed image by applying first image processing to the light intensity signals input from the first light receiving unit 37 by using the first point image intensity distribution stored in the memory unit 13. The arithmetic operation unit 15 generates a normal two-dimensional image by applying second image processing to the light intensity signals input from the second light receiving unit 39 by using the second point image intensity distribution stored in the memory unit 13.

In the image acquisition device 31 with the above-described structure, a portion of the light having passed through the phase filter 7 is incident on the microlens array 5 via the optical element 33, and the light having passed through each of the microlenses 5a is received by the plurality of first light receiving elements 37a of the first light receiving unit 37. Therefore, a high-definition light-field processed image can be acquired by the arithmetic operation unit 15 on the basis of the light intensity signals output from the first light receiving unit 37 and the first point image intensity distribution stored in the memory unit 13.

On the other hand, the rest of the light having passed through the phase filter 7 is reflected by the optical element 33 and is received by the plurality of second light receiving elements 39a of the second light receiving unit 39, without passing through the microlenses 5a. Therefore, a normal two-dimensional image with an extended depth of field can be acquired by the arithmetic operation unit 15 on the basis of the light intensity signals output from the second light receiving unit 39 and the second point image intensity distribution stored in the memory unit 13.

Therefore, according to the image acquisition device 31 of this embodiment, both a light-field image and a normal two-dimensional image can be acquired without moving an optical system by means of the adjusting unit 35. Image acquisition in the first arrangement state and the second arrangement state can be performed at the same time.

Figure 14:
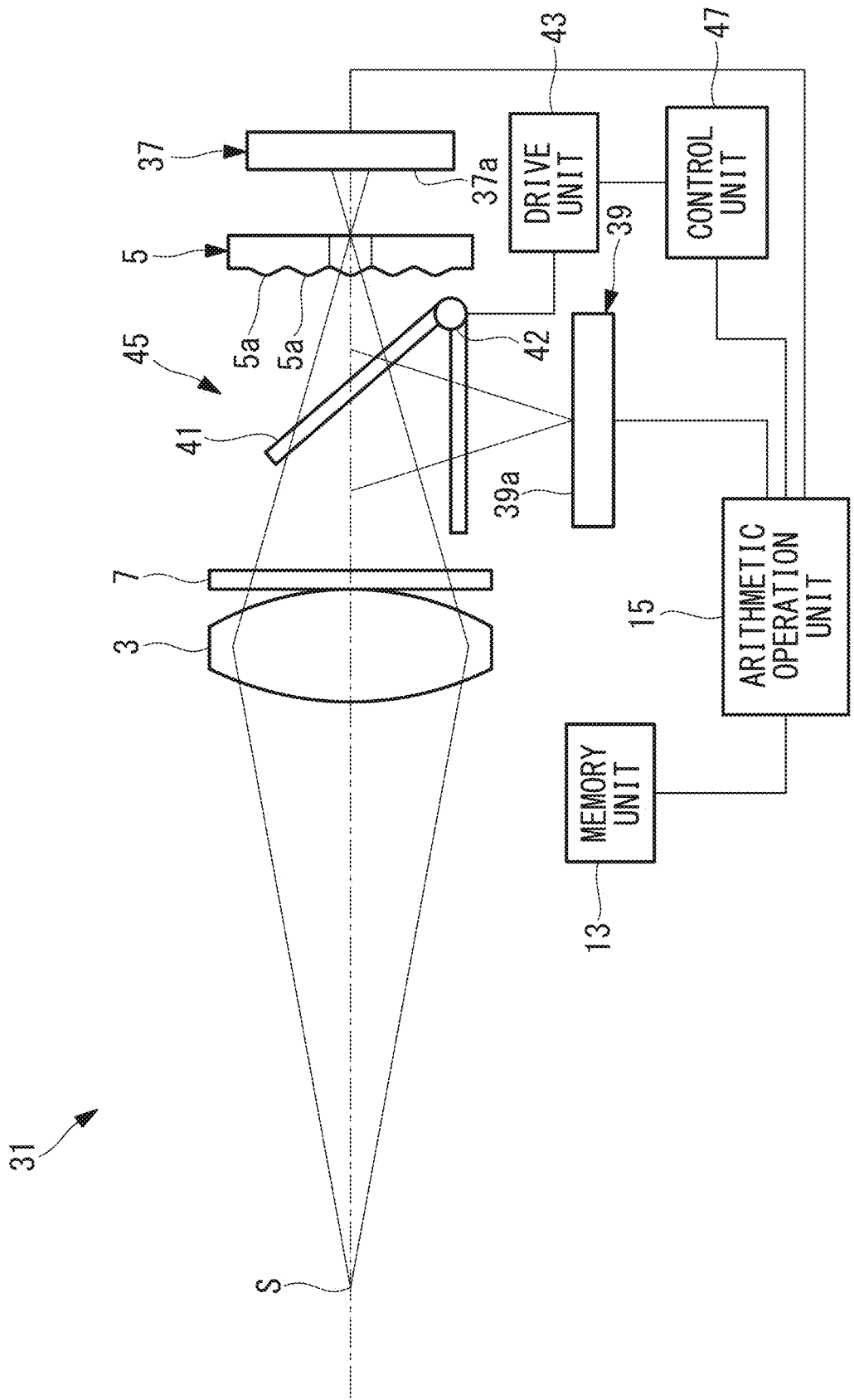
FIG. 14 is a schematic configuration diagram of an image acquisition device according to a modification of the third embodiment of the present invention.

As shown in, for example, FIG. 14, this embodiment may employ, instead of the adjusting unit 35, an adjusting unit 45 provided with an optical element (optical path splitting unit) 41, such as a reflection mirror, for reflecting light and a drive unit 43 for switching between insertion and removal of the optical element 41 into and out of the optical path of the light from the subject S. This embodiment may include a control unit 47 for controlling the drive unit 43.

By means of the drive unit 43, the optical element 41 can change the swiveling angle about a predetermined swiveling axis 42 orthogonal to the optical axis of the image-acquisition optical system 3. When the drive unit 43 changes the swiveling angle of the optical element 41 in a direction along the optical axis of the image-acquisition optical system 3, the optical element 41 is moved out of the optical path, and all light from the phase filter 7 is incident on the first light receiving unit 37 via the microlens array 5. When the drive unit 43 changes the swiveling angle of the optical element 41 so as to form 45° relative to the optical axis of the image-acquisition optical system 3, the optical element 41 is moved into the optical path, so that all light from the phase filter 7 is reflected by the optical element 41 and is incident on the second light receiving unit 39.

Light having passed through the phase filter 7 while the optical element 41 is disposed out of the optical path is received by the plurality of first light receiving elements 37a of the first light receiving unit 37 arranged at the back focal positions of the microlenses 5a, without being reflected by the optical element 41. On the other hand, light having passed through the phase filter 7 while the optical element 41 is inserted in the optical path is reflected by the optical element 33 and is received by the plurality of second light receiving elements 39a of the second light receiving unit 39 arranged at the position of another primary image formed in the optical path, i.e., at the positions corresponding to the vicinities of the principal point positions of the microlenses 5a. Therefore, the adjusting unit 45 can switch between the first arrangement state and the second arrangement state by splitting, by means of the optical element 33, the optical path of the light from the phase filter 7.

The control unit 47 has a configuration similar to that of the control unit 19. This control unit 47 controls the drive unit 43 to insert and remove the optical element 41 into and out of the optical path of the light from the subject S. By doing so, the control unit 47 controls the adjusting unit 45 to switch between the first arrangement state and the second arrangement state.

When the first arrangement state is selected, the control unit 47 inputs, to the arithmetic operation unit 15, information indicating that the first arrangement state is selected, and when the second arrangement state is selected, the control unit 47 inputs, to the arithmetic operation unit 15, information indicating that the second arrangement state is selected.

In this modification, the light intensity signals output from the first light receiving unit 37 and the light intensity signals output from the second light receiving unit 39 are input to the arithmetic operation unit 15. In the case where information indicating that the first arrangement state is selected is input from the control unit 47, the arithmetic operation unit 15 generates a light-field processed image by applying first image processing to the light intensity signals input from the first light receiving unit 37 by using the first point image intensity distribution stored in the memory unit 13. In the case where information indicating that the second arrangement state is selected is input from the control unit 47, the arithmetic operation unit 15 generates a normal two-dimensional image by applying second image processing to the light intensity signals input from the second light receiving unit 39 by using the second point image intensity distribution stored in the memory unit 13.

According to this modification, it is possible to switch between the first arrangement state and the second arrangement state merely by causing the adjusting unit 45 to switch between insertion of the optical element 41 into the optical path and removal of the optical element 41 out of the optical path. By means of the control unit 47, it is possible to automate the switching between the first arrangement state and the second arrangement state and the switching between acquisition of a light-field image and acquisition of a normal two-dimensional image.

In this modification, the optical element 41 may be configured to partially transmit light. This makes it possible to acquire images at the same time both in the first arrangement state and in the second arrangement state and, in the case where the signal intensity is very low, to increase the signal intensity in the first arrangement state by moving the optical element 41 out of the path. Such a configuration is effective in, for example, fluoroscopy.

In each of the above-described embodiments, the image-acquisition optical system 3 may be composed of a plurality of lenses or may be composed of an objective optical system and an image-forming optical system. An illumination optical system may be separately provided, and various types of filters may be separately provided.

Figure 15:
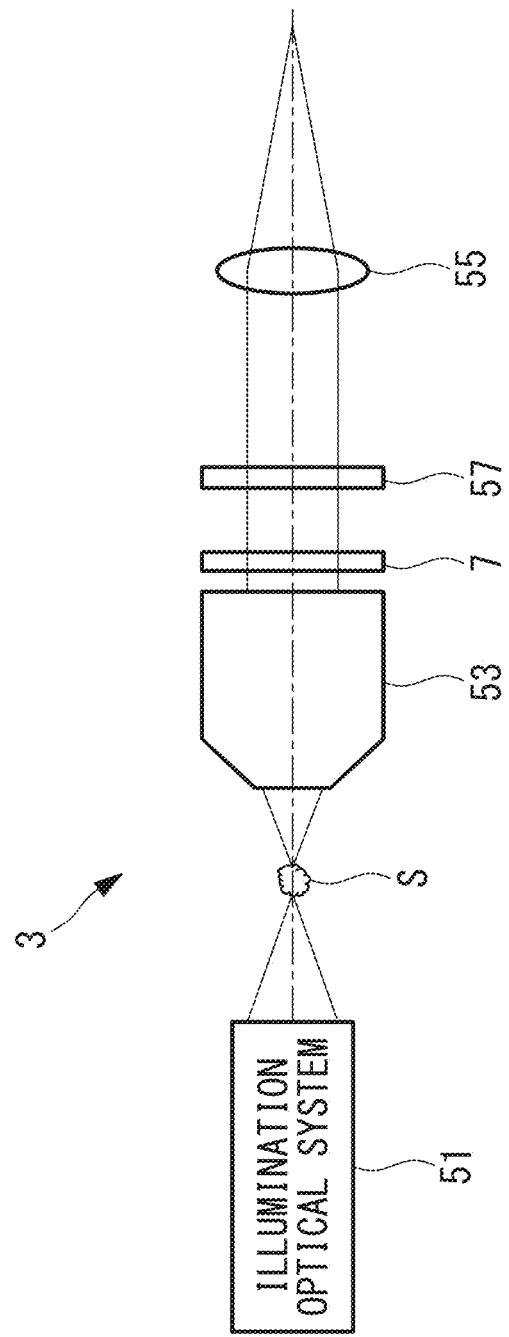
FIG. 15 is a diagram depicting one example of the configuration of an image-acquisition optical system in the case where the image acquisition device according to each of the embodiments of the present invention is incorporated in a microscope.

When each of the image acquisition devices 1, 21, and 31 according to the above-described embodiments is to be incorporated into a microscope, the embodiments may include, as shown in, for example, FIG. 15: an illumination optical system 51 for irradiating the subject S with light; an objective lens 53, serving as the image-acquisition optical system 3, for focusing the light from the subject S; and an image-forming lens 55 for forming an image by focusing the light having passed through the phase filter 7 and the objective lens 53.

Figure 16:
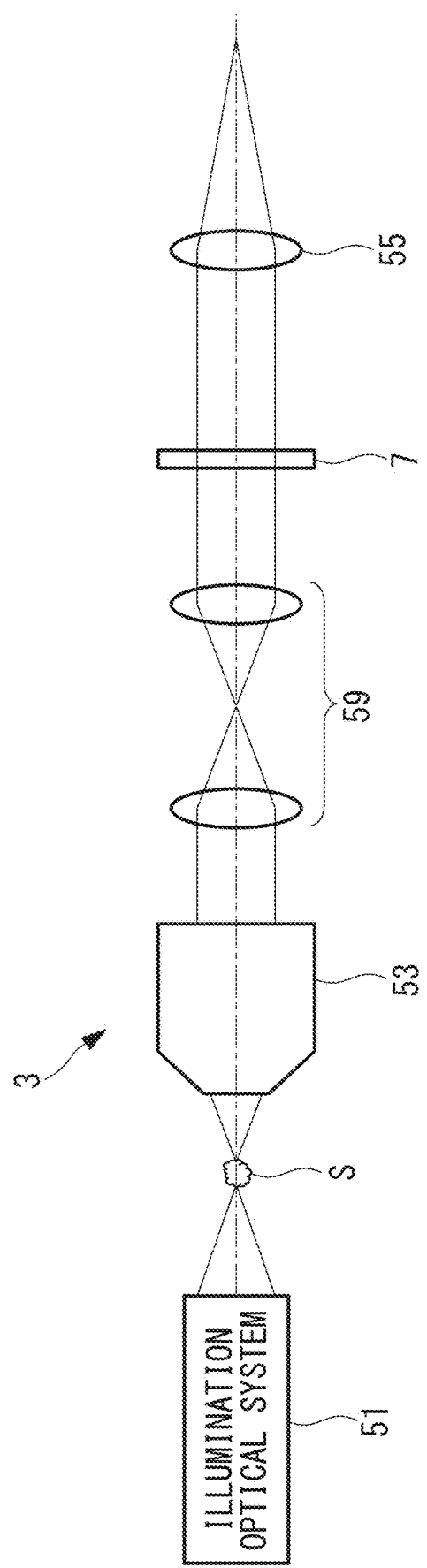
FIG. 16 is a diagram depicting another example of the configuration of the image-acquisition optical system in the case where the image acquisition device according to each of the embodiments of the present invention is incorporated in a microscope.

In the case where fluorescence that is generated in the subject S as a result of the illumination optical system 51 irradiating the subject S with excitation light is to be detected, each of the embodiments may include, as shown in FIG. 15, a filter 57 that eliminates excitation light from the light focused by the objective lens 53 and that transmits fluorescence. As shown in FIG. 16, a pupil relay optical system 59 may be disposed between the objective lens 53 and the phase filter 7. The filter 57 may be of the absorption type arranged in a face-to-face manner, as shown in FIG. 15, or may be of the reflection type, such as a dichroic mirror.

Although each of the above-described embodiments has been described by way of an example of a configuration in which the phase filter 7 is disposed at the position of the exit pupil of the image-acquisition optical system 3, the phase filter 7 may be disposed at a position conjugate to the exit pupil of the image-acquisition optical system 3.

Fourth Embodiment

An image acquisition system according to a fourth embodiment of the present invention will now be described with reference to the drawings.

Figure 17:
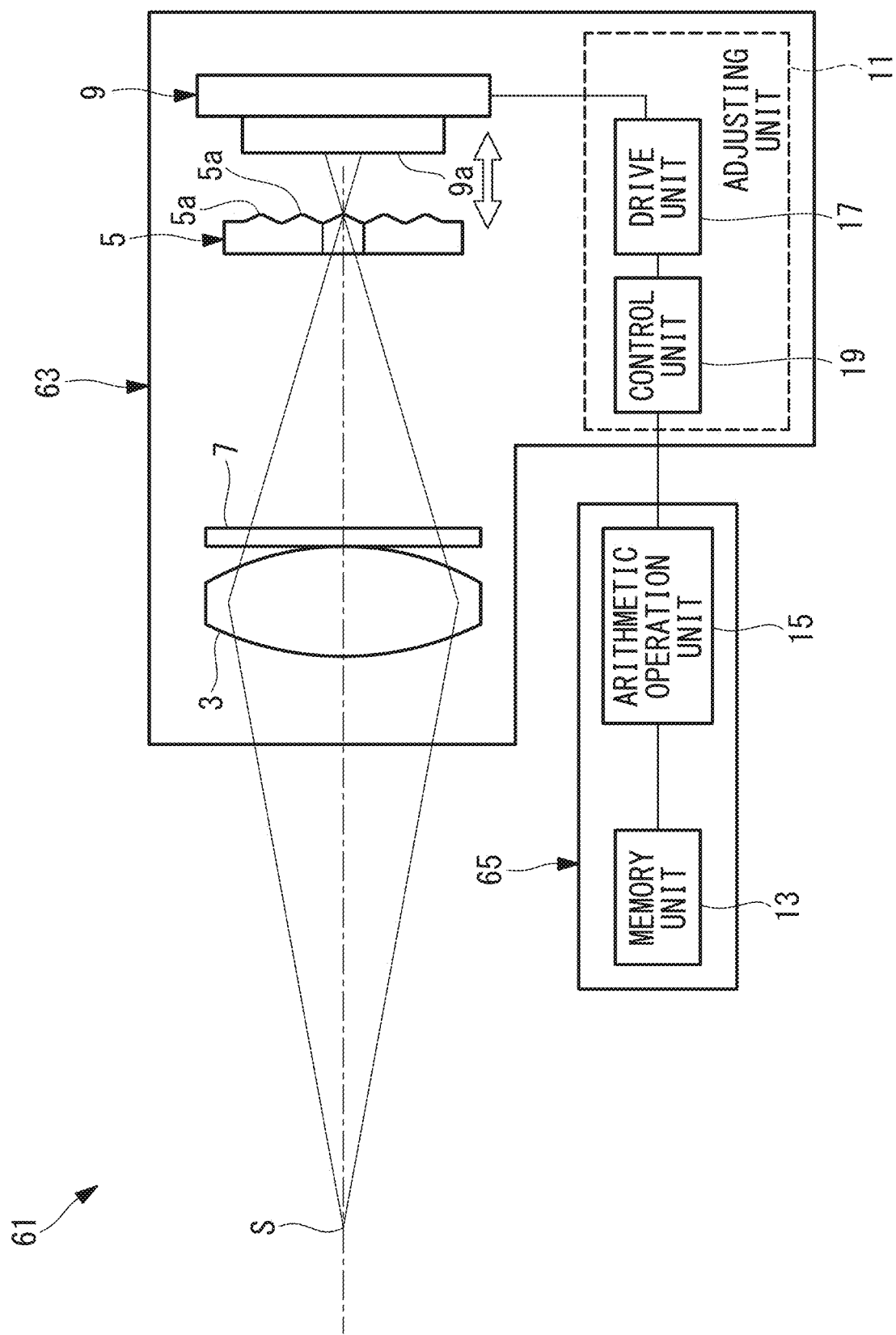
FIG. 17 is a schematic configuration diagram of an image acquisition system according to a fourth embodiment of the present invention.

As shown in FIG. 17, an image acquisition system 61 according to this embodiment includes: an image acquisition device 63 provided with the image-acquisition optical system 3, the phase filter 7, the microlens array 5, the light receiving unit 9, and the adjusting unit 11; and a processing device 65 provided with the memory unit 13 and the arithmetic operation unit 15.

In the description of this embodiment, the same components as those in the image acquisition device 1 according to the above-described first embodiment are denoted by the same reference signs, and descriptions thereof will be omitted.

With the image acquisition system 61 having the above-described structure, in the case where information indicating that the first arrangement state is selected is input from the control unit 19 of the image acquisition device 63, the arithmetic operation unit 15 of the processing device 65 applies first image processing to the light intensity signals sent from the control unit 19 by using the first point image intensity distribution stored in the memory unit 13 of the processing device 65, thus generating a light-field processed image.

In the case where information indicating that the second arrangement state is selected is input from the control unit 19 of the image acquisition device 63, the arithmetic operation unit 15 of the processing device 65 applies second image processing to the light intensity signals sent from the control unit 19 by using the second point image intensity distribution stored in the memory unit 13 of the processing device 65, thus generating a normal two-dimensional image.

In this case, both a high-definition light-field image and a normal two-dimensional image with an extended depth of field can be acquired in the processing device 65 merely by causing the adjusting unit 11 of the image acquisition device 63 to switch between the first arrangement state and the second arrangement state. Therefore, according to the image acquisition system 61 of this embodiment, a plurality of images that produce mutually different effects for the user can be acquired with a simple configuration.

In this embodiment, the image acquisition device 63 may be modified as in the image acquisition devices 21 and 31. More specifically, the image acquisition device 63 may be provided with the relay optical system 23 as in the image acquisition device 21. In this case, the control unit 19 may drive the drive unit 17 and switch between the first arrangement state, in which the plurality of light receiving elements 9a of the light receiving unit 9 are arranged at the positions conjugate to the back focal positions of the microlenses 5a, and the second arrangement state, in which the plurality of light receiving elements 9a of the light receiving unit 9 are arranged at the positions conjugate to the principal point positions of the microlenses 5a.

The image acquisition device 63, as in the image acquisition device 31, may be provided with the adjusting unit 35, instead of the adjusting unit 11. In this case, instead of the light receiving unit 9, the image acquisition device 63 is provided with the first light receiving unit 37 having the plurality of first light receiving elements 37a arranged at the back focal positions of the microlenses 5a, as well as the second light receiving unit 39 having the plurality of second light receiving elements 39a arranged at the position of the other primary image formed in the other optical path split off by the optical element 33. The image acquisition device 63 may be provided with the adjusting unit 45 and the control unit 47, instead of the adjusting unit 35.

Although the embodiments of the present invention have been described in detail with reference to the drawings, the specific structure is not limited to those of these embodiments but includes design changes etc. that do not depart from the spirit of the present invention. The present invention is not limited to the invention applied to each of the above-described embodiments and modifications but can be applied to, for example, embodiments in which these embodiments and modifications are appropriately combined and is not particularly limited.

Although each of the above-described embodiments and modifications thereof has been described by way of an example of the phase filter 7, as the pupil modulation element, for applying modulation of the phase distribution to the light that is to be made incident on the plurality of microlenses 5a via the image-acquisition optical system 3, instead of this, the embodiments and modifications thereof may employ a phase filter for applying modulation of a transmittance distribution to the light that is to be made incident on the plurality of microlenses 5a via the image-acquisition optical system 3 or employ a phase filter for applying modulation of the phase distribution and transmittance distribution.

As a result, the following aspect is read from the above described embodiment of the present invention.

A first aspect of the present invention is an image acquisition device including: an image-acquisition optical system that focuses light from a subject and that forms a primary image of the subject; a microlens array having a plurality of microlenses that are two-dimensionally arranged at the position of the primary image formed by the image-acquisition optical system or at a position conjugate to the primary image and that focus light from the image-acquisition optical system; a pupil modulation element that is disposed at the position of an exit pupil of the image-acquisition optical system, said exit pupil being located on the subject side with respect to the microlens array, or at a position conjugate to the exit pupil and that applies modulation of a phase distribution and/or a transmittance distribution to light to be made incident on the plurality of microlenses via the image-acquisition optical system; a light receiving unit that has a plurality of light receiving elements arranged in units of regions corresponding to the plurality of microlenses, that receives the light focused by the plurality of microlenses, and that performs photoelectric conversion of the light; an adjusting unit that switches between a first arrangement state in which the plurality of light receiving elements are arranged at back focal positions of the microlenses or at positions conjugate to the back focal positions and a second arrangement state in which the plurality of light receiving elements are arranged in the vicinities of principal point positions of the microlenses or at positions conjugate to the principal point positions; a memory unit that stores a first point image intensity distribution indicating a point image intensity distribution for each position on the subject at the light receiving unit in the first arrangement state and a second point image intensity distribution indicating a point image intensity distribution of the subject at the light receiving unit in the second arrangement state; and an arithmetic operation unit that generates a first processed image by using the first point image intensity distribution stored in the memory unit and first image information obtained by photoelectric conversion by the light receiving unit in the first arrangement state and that generates a second processed image by using the second point image intensity distribution stored in the memory unit and second image information obtained by photoelectric conversion by the light receiving unit in the second arrangement state.

According to this aspect, the light that comes from the subject and that is focused by the image-acquisition optical system is focused by the microlenses of the microlens array via the pupil modulation element, and the light having passed through each of the microlenses is received and is subjected to photoelectric conversion by the plurality of light receiving elements of the light receiving unit. Then, processed images of the subject are generated by the arithmetic operation unit on the basis of the image information obtained by photoelectric conversion by the light receiving elements and the point image intensity distributions stored in the memory unit.

In this case, it is possible to acquire a high-definition light-field image, serving as the first processed image, by selecting the first arrangement state, in which the plurality of light receiving elements are arranged by the adjusting unit at the back focal positions of the microlenses or at the positions conjugate thereto. On the other hand, it is possible to acquire, for example, a normal two-dimensional image with an extended depth of field, serving as the second processed image, by selecting the second arrangement state, in which the plurality of light receiving elements are arranged by the adjusting unit in the vicinities of the principal point positions of the microlenses or at the positions conjugate to the principal point positions.

Therefore, it is possible to acquire a plurality of images that produce mutually different effects for the user with a simple configuration merely for switching between the first arrangement state and the second arrangement state by means of the adjusting unit.

The above-described aspect may include: a relay optical system that forms a secondary image by relaying, to the plurality of light receiving elements, the light focused by the microlenses and by re-forming the primary image, wherein the adjusting unit may cause the plurality of light receiving elements to be conjugate to the back focal positions of the microlenses in the first arrangement state and may cause the plurality of light receiving elements to be conjugate to the principal point positions of the microlenses in the second arrangement state.

By relaying, by means of the relay optical system, the light having passed through the microlenses, each of the light receiving elements can be arranged at the position conjugate to the back focal position of each of the microlenses in the first arrangement state, and each of the light receiving elements can be arranged at the position conjugate to the principal point position of each of the microlenses in the second arrangement state. By doing so, regardless of the shape of each of the microlenses, it is possible to easily select the first arrangement state and the second arrangement state, without causing the optical systems to interfere with each other.

In the above-described aspect, the adjusting unit may include an optical path splitting unit that split the optical path of the light focused by the image-acquisition optical system, the position of the exit pupil or the position conjugate to the exit pupil may be located on the subject side with respect to the optical path splitting unit, the plurality of microlenses may be arranged at the position of the primary image formed in one optical path split off by the optical path splitting unit or at the position conjugate to the primary image, and the light receiving unit may include: a first light receiving unit having the plurality of light receiving elements arranged at the back focal positions of the microlenses or at the positions conjugate to the back focal positions; and a second light receiving unit having the plurality of light receiving elements arranged at the position of another primary image formed in another optical path split off by the optical path splitting unit or at a position conjugate to the other primary image.

With this structure, of the light having passed through the pupil modulation element, the light in the one optical path that is split off by the optical path splitting unit is incident on the microlens array, and the light that has passed through each of the microlenses is received by the plurality of light receiving elements of the first light receiving unit. Therefore, a high-definition light-field image, serving as the first processed image, can be acquired by the first light receiving unit. On the other hand, of the light having passed through the pupil modulation element, the light in the other optical path that is split off by the optical path splitting unit is received by the plurality of light receiving elements of the second light receiving unit without passing through the microlenses. Therefore, for example, a normal two-dimensional image with an extended depth of field, serving as the second processed image, can be acquired by the second light receiving unit.

The above-described aspect may include: a control unit that controls switching between the first arrangement state and the second arrangement state by means of the adjusting unit, wherein when the control unit causes the adjusting unit to select the first arrangement state, the arithmetic operation unit may generate the first processed image, and when the control unit causes the adjusting unit to select the second arrangement state, the arithmetic operation unit may generate the second processed image.

With this structure, it is possible to automate the switching between the acquisition of a light-field image as the first processed image and the acquisition of a normal two-dimensional image as the second processed image by causing the control unit to switch between the first arrangement state and the second arrangement state.

In the above-described aspect, the pupil modulation element may operate so as to extend the depth of field of the second processed image.

With this structure, a normal two-dimensional image with an extended depth of field, serving as the second processed image, can be acquired.

In the above-described aspect, the following conditional expression may be satisfied.

$$\Delta Z_1/\Delta Z_2 < 1$$

Here, $\Delta Z_1$ is the subject depth resolution of the first processed image, and $\Delta Z_2$ is the depth of field of the second processed image.

When the above-described conditional expression is satisfied, it is possible to acquire a high-definition first processed image, as well as a second processed image having a depth of field equal to or larger than the subject depth resolution of this first processed image, by using a single device. In this case, sufficiently independent effects can be produced between the first processed image and the second processed image.

A second aspect of the present invention is an image acquisition system including: an image acquisition device including an image-acquisition optical system that focuses light from a subject and that forms a primary image of the subject, a microlens array having a plurality of microlenses that are two-dimensionally arranged at the position of the primary image formed by the image-acquisition optical system or at a position conjugate to the primary image and that focus light from the image-acquisition optical system, a pupil modulation element that is disposed at the position of an exit pupil of the image-acquisition optical system, said exit pupil being located on the subject side with respect to the microlens array, or at a position conjugate to the exit pupil and that applies modulation of a phase distribution and/or a transmittance distribution to light to be made incident on the plurality of microlenses via the image-acquisition optical system, a light receiving unit that has a plurality of light receiving elements arranged in units of regions corresponding to the plurality of microlenses, that receives the light focused by the plurality of microlenses, and that performs photoelectric conversion of the light, and an image acquisition device having an adjusting unit that switches between a first arrangement state in which the plurality of light receiving elements are arranged at back focal positions of the microlenses or at positions conjugate to the back focal positions and a second arrangement state in which the plurality of light receiving elements are arranged in the vicinities of principal point positions of the microlenses or at positions conjugate to the principal point positions; a memory unit that stores a first point image intensity distribution indicating a point image intensity distribution for each position on the subject at the light receiving unit in the first arrangement state and a second point image intensity distribution indicating a point image intensity distribution of the subject at the light receiving unit in the second arrangement state; and an arithmetic operation unit that generates a first processed image by using the first point image intensity distribution stored in the memory unit and first image information obtained by photoelectric conversion by the light receiving unit in the first arrangement state and that generates a second processed image by using the second point image intensity distribution stored in the memory unit and second image information obtained by photoelectric conversion by the light receiving unit in the second arrangement state.

According to this aspect, processed images of the subject can be generated by the arithmetic operation unit on the basis of the image information output from the image acquisition device and the point image intensity distributions stored in the memory unit. In this case, both a high-definition light-field image and a normal two-dimensional image with an extended depth of field can be acquired merely by switching between the first arrangement state and the second arrangement state by means of the adjusting unit of the image acquisition device. Therefore, a plurality of images that produce mutually different effects for the user can be acquired with a simple configuration.

The above-described aspect may include: a relay optical system that forms a secondary image by relaying, to the plurality of light receiving elements, the light focused by the microlenses and by re-forming the primary image, wherein the adjusting unit may cause the plurality of light receiving elements to be conjugate to the back focal positions of the microlenses in the first arrangement state and may cause the plurality of light receiving elements to be conjugate to the principal point positions of the microlenses in the second arrangement state.

In the above-described aspect, the adjusting unit may include an optical path splitting unit that split the optical path of the light focused by the image-acquisition optical system, the position of the exit pupil or the position conjugate to the exit pupil may be located on the subject side with respect to the optical path splitting unit, the plurality of microlenses may be arranged at the position of the primary image formed in one optical path split off by the optical path splitting unit or at the position conjugate to the primary image, and the light receiving unit may include: a first light receiving unit having the plurality of light receiving elements arranged at the positions conjugate to the back focal positions of the microlenses; and a second light receiving unit having the plurality of light receiving elements arranged at a position conjugate to another primary image formed in another optical path split off by the optical path splitting unit.

The above-described aspect may include: a control unit that controls switching between the first arrangement state and the second arrangement state by means of the adjusting unit, wherein when the control unit causes the adjusting unit to select the first arrangement state, the arithmetic operation unit may generate the first processed image, and when the control unit causes the adjusting unit to select the second arrangement state, the arithmetic operation unit may generate the second processed image.

In the above-described aspect, the pupil modulation element may operate so as to extend the depth of field of the second processed image.

In the above-described aspect, the following conditional expression may be satisfied.

$$\Delta Z_1 / \Delta Z_2 < 1$$

Here, $\Delta Z_1$ is the subject depth resolution of the first processed image, and $\Delta Z_2$ is the depth of field of the second processed image.

REFERENCE SIGNS LIST

1 Image acquisition device
3 Image-acquisition optical system
5 Microlens array
5a Microlens
7 Phase filter (pupil modulation element)
9 Light receiving unit
9a Light receiving element
11 Adjusting unit
13 Memory unit
15 Arithmetic operation unit
19, 47 Control unit
23 Relay optical system
33, 41 Optical element (optical path splitting unit)
37 First light receiving unit
37a First light receiving element (light receiving element)
39 Second light receiving unit
39a Second light receiving element (light receiving element)
61 Image acquisition system
S Subject

The invention claimed is:

1. An image acquisition device comprising:
an image-acquisition optical system that is configured to focus light from a subject and that forms a primary image of the subject;
a microlens array having a plurality of microlenses that are two-dimensionally arranged at a position of the primary image formed by the image-acquisition optical system or at a position conjugate to the primary image and that is configured to focus light from the image-acquisition optical system;
a pupil modulation element that is disposed at a position of an exit pupil of the image-acquisition optical system, said exit pupil being located on the subject side with respect to the microlens array, or at a position conjugate to the exit pupil and that is configured to apply modulation of a phase distribution and/or a transmittance distribution to light to be made incident on the plurality of microlenses via the image-acquisition optical system;
a light receiving unit that has a plurality of light receiving elements arranged in units of regions corresponding to the plurality of microlenses, that is configured to receive the light focused by the plurality of microlenses, and to perform photoelectric conversion of the light;

an adjusting unit that is configured to switch between a first arrangement state in which the plurality of light receiving elements are arranged at back focal positions of the microlenses or at positions conjugate to the back focal positions and a second arrangement state in which the plurality of light receiving elements are arranged in vicinities of a principal point positions of the microlenses or at positions conjugate to the principal point positions;

a memory unit that is configured to store a first point image intensity distribution indicating a point image intensity distribution for each position on the subject at the light receiving unit in the first arrangement state and a second point image intensity distribution indicating a point image intensity distribution of the subject at the light receiving unit in the second arrangement state; and an arithmetic operation unit that is configured to generate a first processed image by using the first point image intensity distribution stored in the memory unit and first image information obtained by photoelectric conversion by the light receiving unit in the first arrangement state and that generates a second processed image by using the second point image intensity distribution stored in the memory unit and second image information obtained by photoelectric conversion by the light receiving unit in the second arrangement state.

2. The image acquisition device according to claim 1, comprising:

a relay optical system that is configured to form a secondary image by relaying, to the plurality of light receiving elements, the light focused by the microlenses and by re-forming the primary image, wherein the adjusting unit causes the plurality of light receiving elements to be conjugate to the back focal positions of the microlenses in the first arrangement state and causes the plurality of light receiving elements to be conjugate to the principal point positions of the microlenses in the second arrangement state.

3. The image acquisition device according to claim 1, wherein the adjusting unit includes an optical path splitting unit that is configured to split the optical path of the light focused by the image-acquisition optical system, the position of the exit pupil or the position conjugate to the exit pupil is located on the subject side with respect to the optical path splitting unit, the plurality of microlenses are arranged at the position of the primary image formed in one optical path split off by the optical path splitting unit or at the position conjugate to the primary image, and the light receiving unit includes: a first light receiving unit having the plurality of light receiving elements arranged at the back focal positions of the microlenses or at the positions conjugate to the back focal positions; and a second light receiving unit having the plurality of light receiving elements arranged at the position of another primary image formed in another optical path split off by the optical path splitting unit or at a position conjugate to the other primary image.

4. The image acquisition device according to claim 1, comprising:

a control unit that is configured to control the adjusting unit, wherein when the first arrangement state is selected, the arithmetic operation unit generates the first processed image, and when the second arrangement state is selected, the arithmetic operation unit generates the second processed image.

5. The image acquisition device according to claim 1, wherein the pupil modulation element operates so as to extend the depth of field of the second processed image.

6. The image acquisition device according to claim 1, wherein conditional expression $\Delta Z_1/\Delta Z_2<1$ is satisfied, where $\Delta Z_1$ is a subject depth resolution of the first processed image, and $\Delta Z_2$ is the depth of field of the second processed image.

7. An image acquisition system comprising:

an image acquisition device including an image-acquisition optical system that is configured to focus light from a subject and that forms a primary image of the subject, a microlens array having a plurality of microlenses that are two-dimensionally arranged at a position of the primary image formed by the image-acquisition optical system or at a position conjugate to the primary image and that is configured to focus light from the image-acquisition optical system, a pupil modulation element that is disposed at a position of an exit pupil of the image-acquisition optical system, said exit pupil being located on the subject side with respect to the microlens array, or at a position conjugate to the exit pupil and that is configured to apply modulation of a phase distribution and/or a transmittance distribution to light to be made incident on the plurality of microlenses via the image-acquisition optical system, a light receiving unit that has a plurality of light receiving elements arranged in units of regions corresponding to the plurality of microlenses, that is configured to receive the light focused by the plurality of microlenses, and to perform photoelectric conversion of the light, and an image acquisition device having an adjusting unit that is configured to switch between a first arrangement state in which the plurality of light receiving elements are arranged at back focal positions of the microlenses or at positions conjugate to the back focal positions and a second arrangement state in which the plurality of light receiving elements are arranged in vicinities of a principal point positions of the microlenses or at positions conjugate to the principal point positions;

a memory unit that is configured to store a first point image intensity distribution indicating a point image intensity distribution for each position on the subject at the light receiving unit in the first arrangement state and a second point image intensity distribution indicating a point image intensity distribution of the subject at the light receiving unit in the second arrangement state; and an arithmetic operation unit that is configured to generate a first processed image by using the first point image intensity distribution stored in the memory unit and first image information obtained by photoelectric conversion by the light receiving unit in the first arrangement state and that generates a second processed image by using the second point image intensity distribution stored in the memory unit and second image information obtained by photoelectric conversion by the light receiving unit in the second arrangement state.

8. The image acquisition system according to claim 7, comprising:

a relay optical system that is configured to form a secondary image by relaying, to the plurality of light receiving elements, the light focused by the microlenses and by re-forming the primary image, wherein the adjusting unit causes the plurality of light receiving elements to be conjugate to the back focal positions of the microlenses in the first arrangement state and causes the plurality of light receiving elements to be conjugate to the principal point positions of the microlenses in the second arrangement state.

9. The image acquisition system according to claim 7, wherein the adjusting unit includes an optical path splitting unit that is configured to split the optical path of the light focused by the image-acquisition optical system, the position of the exit pupil or the position conjugate to the exit pupil is located on the subject side with respect to the optical path splitting unit, the plurality of microlenses are arranged at the position of the primary image formed in one optical path split off by the optical path splitting unit or at the position conjugate to the primary image, and the light receiving unit includes: a first light receiving unit having the plurality of light receiving elements arranged at the positions conjugate to the back focal positions of the microlenses; and a second light receiving unit having the plurality of light receiving elements arranged at a position conjugate to another primary image formed in another optical path split off by the optical path splitting unit.

10. The image acquisition system according to claim 7, comprising:

a control unit that is configured to control the adjusting unit, wherein when the first arrangement state is selected, the arithmetic operation unit generates the first processed image, and when the second arrangement state is selected, the arithmetic operation unit generates the second processed image.

11. The image acquisition system according to claim 7, wherein the pupil modulation element operates so as to extend the depth of field of the second processed image.

12. The image acquisition system according to claim 7, wherein conditional expression $\Delta Z_1/\Delta Z_2 < 1$ is satisfied, where $\Delta Z_1$ is a subject depth resolution of the first processed image, and $\Delta Z_2$ is the depth of field of the second processed image.

* * * * *